United States Patent
Noguchi et al.

(10) Patent No.: US 8,386,707 B2
(45) Date of Patent: Feb. 26, 2013

(54) VIRTUAL DISK MANAGEMENT PROGRAM, STORAGE DEVICE MANAGEMENT PROGRAM, MULTINODE STORAGE SYSTEM, AND VIRTUAL DISK MANAGING METHOD

(75) Inventors: Yasuo Noguchi, Kawasaki (JP);
Kazutaka Ogihara, Kawasaki (JP);
Masahisa Tamura, Kawasaki (JP);
Yoshihiro Tsuchiya, Kawasaki (JP);
Tetsutaro Maruyama, Kawasaki (JP);
Takashi Watanabe, Kawasaki (JP);
Tatsuo Kumano, Kawasaki (JP);
Kazuichi Oe, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 584 days.

(21) Appl. No.: 12/502,752

(22) Filed: Jul. 14, 2009

(65) Prior Publication Data

US 2010/0049918 A1   Feb. 25, 2010

(30) Foreign Application Priority Data

Aug. 20, 2008   (JP) ................................ 2008-211544
Jun. 2, 2009   (JP) ................................ 2009-132712

(51) Int. Cl.
*G06F 12/00*   (2006.01)
*G06F 13/00*   (2006.01)

(52) U.S. Cl. ......... 711/114; 711/100; 711/154; 711/200
(58) Field of Classification Search .................. 711/100, 711/154, 200, 203, 205, 221, 114–115
See application file for complete search history.

(56) References Cited

U.S. PATENT DOCUMENTS

| 6,807,590 | B1 | 10/2004 | Carlson et al. | |
|---|---|---|---|---|
| 7,058,770 | B2 * | 6/2006 | Kanai et al. | 711/156 |
| 7,069,380 | B2 * | 6/2006 | Ogawa et al. | 711/112 |
| 7,363,457 | B1 | 4/2008 | Dekoning et al. | |
| 7,404,035 | B2 * | 7/2008 | Anzai et al. | 711/114 |
| 7,917,551 | B2 * | 3/2011 | Chikusa et al. | 707/821 |

(Continued)

FOREIGN PATENT DOCUMENTS

| JP | 2002-182862 | 6/2002 |
|---|---|---|
| JP | 2005-4681 | 1/2005 |

(Continued)

OTHER PUBLICATIONS

Communication with Extended European Search Report issued Jun. 26, 2012 from corresponding European Patent Application No. 09165890.6.

(Continued)

*Primary Examiner* — Tuan V. Thai
(74) *Attorney, Agent, or Firm* — Greer, Burns & Crain, Ltd.

(57) ABSTRACT

In a multinode storage system, a virtual disk associated with a storage device to be connected is created, and a slice of a connected storage device is allocated to one segment of the virtual disk. Next, one slice of data in the storage device to be connected is copied to the connected storage device. The rest of the data in the storage device to be connected is divided into slices, which are allocated to segments of the virtual disk. Then, metadata of the rest of the slices is written into a management information area in which copying of the data therefrom has been completed.

8 Claims, 17 Drawing Sheets

U.S. PATENT DOCUMENTS

| | | |
|---|---|---|
| 7,966,470 B2 * | 6/2011 | Sakurai et al. ................ 711/170 |
| 2005/0235109 A1 | 10/2005 | Ogihara et al. |
| 2006/0010290 A1 | 1/2006 | Sasamoto |
| 2008/0068899 A1 | 3/2008 | Ogihara et al. |

FOREIGN PATENT DOCUMENTS

| | | |
|---|---|---|
| JP | B2 3645270 | 5/2005 |
| JP | A 2006-24024 | 1/2006 |
| JP | 2007-34551 | 2/2007 |
| JP | A 2007-148490 | 6/2007 |
| JP | 2008-71209 | 3/2008 |
| WO | WO 97/09676 A1 | 3/1997 |
| WO | WO 2004/104845 A1 | 2/2004 |

OTHER PUBLICATIONS

Japanese Office Action issued in Japanese Application No. 2009-132712 on Sep. 18, 2012.

\* cited by examiner

FIG. 7

140 METADATA STORING SECTION

141 METADATA TABLE

| DISK NODE ID | SLICE ID | STATUS | VIRTUAL DISK ID | SEGMENT ID | VIRTUAL DISK ADDRESS | PAIRED DISK NODE ID | PAIRED SLICE ID |
|---|---|---|---|---|---|---|---|
| SN-A | 1 | F | | | | | |
| SN-A | 2 | P | LVOL-X | 1 | ADDR1 | SN-B | 2 |
| SN-A | 3 | F | | | | | |
| SN-A | 4 | P | LVOL-X | 4 | ADDR4 | SN-C | 1 |
| SN-A | 5 | S | LVOL-X | 2 | ADDR2 | SN-C | 5 |
| ... | ... | ... | ... | ... | ... | ... | ... |

FIG. 8

520 VIRTUAL DISK METADATA-STORING SECTION

521 VIRTUAL DISK METADATA TABLE

| DISK NODE ID | SLICE ID | STA-TUS | VIRTUAL DISK ID | SEGMENT ID | VIRTUAL DISK ADDRESS | PAIRED DISK NODE ID | PAIRED SLICE ID |
|---|---|---|---|---|---|---|---|
| SN-A | 2 | P | LVOL-X | 1 | ADDR1 | SN-B | 2 |
| SN-B | 2 | S | LVOL-X | 1 | ADDR1 | SN-A | 2 |
| SN-C | 5 | P | LVOL-X | 2 | ADDR2 | SN-A | 5 |
| SN-A | 5 | S | LVOL-X | 2 | ADDR2 | SN-C | 5 |
| SN-B | 4 | P | LVOL-X | 3 | ADDR3 | SN-C | 3 |
| SN-C | 3 | S | LVOL-X | 3 | ADDR3 | SN-B | 4 |
| SN-A | 4 | P | LVOL-X | 4 | ADDR4 | SN-C | 1 |
| SN-C | 1 | S | LVOL-X | 4 | ADDR4 | SN-A | 4 |
| ... | ... | ... | ... | ... | ... | ... | ... |

520 VIRTUAL DISK METADATA TABLE
522 VIRTUAL DISK METADATA-STORING SECTION
521

| DISK NODE ID | SLICE ID | STATUS | VIRTUAL DISK ID | SEGMENT ID | VIRTUAL DISK ADDRESS | PAIRED DISK NODE ID | PAIRED SLICE ID |
|---|---|---|---|---|---|---|---|
| SN-A | 1 | P | LVOL-Y | 1 | ADDR1 | SN-C | 2 |
| SN-D | 1 | P | LVOL-Y | 2 | ADDR2 | SN-B | 5 |
| SN-D | 2 | P | LVOL-Y | 3 | ADDR3 | SN-A | 3 |
| SN-D | 3 | P | LVOL-Y | 4 | ADDR3 | SN-B | 3 |
| ... | ... | ... | ... | ... | ... | ... | ... |
| SN-C | 2 | R | LVOL-Y | 1 | ADDR1 | SN-A | 1 |
| SN-B | 5 | R | LVOL-Y | 2 | ADDR2 | SN-D | 1 |
| SN-A | 3 | R | LVOL-Y | 3 | ADDR3 | SN-D | 2 |
| SN-B | 3 | R | LVOL-Y | 4 | ADDR3 | SN-D | 3 |
| ... | ... | ... | ... | ... | ... | ... | ... |

FIG. 13

140 METADATA TABLE

141 METADATA STORING SECTION

| DISK NODE ID | SLICE ID | STA-TUS | VIRTUAL DISK ID | SEGMENT ID | VIRTUAL DISK ADDRESS | PAIRED DISK NODE ID | PAIRED SLICE ID |
|---|---|---|---|---|---|---|---|
| SN-A | 1 | P | LVOL-Y | 1 | ADDR1 | SN-C | 2 |
| SN-A | 2 | P | LVOL-X | 1 | ADDR1 | SN-B | 2 |
| SN-A | 3 | R | LVOL-Y | 3 | ADDR3 | SN-D | 2 |
| SN-A | 4 | P | LVOL-X | 4 | ADDR4 | SN-C | 1 |
| SN-A | 5 | S | LVOL-X | 2 | ADDR2 | SN-C | 5 |
| ... | ... | ... | ... | ... | ... | ... | ... |

FIG. 14

440 METADATA-STORING SECTION

441 METADATA TABLE

| DISK NODE ID | SLICE ID | STA-TUS | VIRTUAL DISK ID | SEGMENT ID | VIRTUAL DISK ADDRESS | PAIRED DISK NODE ID | PAIRED SLICE ID |
|---|---|---|---|---|---|---|---|
| SN-D | 1 | P | LVOL-Y | 2 | ADDR2 | SN-B | 5 |
| SN-D | 2 | P | LVOL-Y | 3 | ADDR3 | SN-A | 3 |
| SN-D | 3 | P | LVOL-Y | 4 | ADDR3 | SN-B | 3 |
| .. | .. | .. | .. | .. | .. | .. | .. |

FIG. 16

VIRTUAL DISK MANAGEMENT PROGRAM, STORAGE DEVICE MANAGEMENT PROGRAM, MULTINODE STORAGE SYSTEM, AND VIRTUAL DISK MANAGING METHOD

CROSS-REFERENCE TO RELATED APPLICATIONS

This application is based upon and claims the benefit of priority of the prior Japanese Patent Application No. 2008-211544, filed on Aug. 20, 2008, and the Japanese Patent Application No. 2009-132712, filed on Jun. 2, 2009, the entire contents of which are incorporated herein by reference.

FIELD

The embodiment discussed herein is related to a virtual disk management program, a storage device management program, a multinode storage system and a virtual disk management method, for performing access to a plurality of storage devices via a virtual disk.

BACKGROUND

In a large-scale computer network, to ensure reliability of data, there is a case where data is multiplexed and stored in a plurality of storage devices. As a technique of multiplexing data, there has been proposed a method of distributing and storing data in a plurality of storage devices which are respectively connected to a plurality of nodes (disk nodes) on a network. A system in which data are thus distributed and managed in a plurality of nodes on the network is referred to as a multinode storage system.

In the multinode storage system, a virtual disk is defined in a node for access (access node), and data is input/output via the virtual disk. A storage area in the virtual disk is divided into a plurality of segments, and each of the segments is associated with a plurality of storage areas within the respective storage devices. When an application specifies a segment on the virtual disk to write data therein, the data is written in respective storage areas of the storage devices, associated with the specified segment. By multiplexing data as described above, it is possible to improve the reliability of the data (see e.g. International Publication Pamphlet No. WO2004/104845).

By the way, if data is duplexed, in the storage devices, storage areas are used which correspond to twice as large as the data amount to be stored. Therefore, also to reduce waste of resources, data which does not require reliability is often controlled not to be duplexed. However, if a computer system has been operated for a long term, also as to data supposed not to require high reliability, it sometimes becomes necessary to ensure reliability of the data by duplicating the same. In this case, it is necessary to transfer the data which has been stored in a storage device to a virtual disk for duplexing.

To duplex the data stored in the storage device (used disk), using the virtual disk, there are two methods of transferring data described hereafter.

First, if access to the used disk can be stopped, it is possible to make use of the following data transfer method:

After creating a virtual disk, access to the used disk is suspended.

Data stored in the used disk is copied to the virtual disk.

However, in the above-described data transfer method, it is impossible to access the used disk during copying, and hence service stop time occurs due to the data transfer. If it is not possible to stop access to the used disk, copying of the data is carried out by the following data transfer process:

After creating a virtual disk, a snapshot of the used disk is created by the OS (Operating System) in use. Snapshot is a technique for virtually duplicating data of the whole disk at a certain time point. For example, according to a copy-on-write snapshot, before creating a snapshot, the relationship between data and a block in the disk storing the data is recorded. Then, the access to the disk is monitored, and if data is updated, the data before the update is copied to another area (shadow copy area). This makes it possible to preserve in the disk the data at the time of creating the snapshot.

The snapshot is copied to the virtual disk by the OS in use. At this time, in place of data which has been updated after creating the snapshot, corresponding data before the update is read out from the shadow copy area, whereas data which has not been updated is read out from the used disk. The data which has been copied to the virtual disk is actually written in the storage areas of the disk devices, which are associated with the segments which form the virtual disk.

Access to the used disk is stopped, and the used disk is synchronized with the virtual disk. That is, the data which has been updated after creating the snapshot of the used disk is copied to the virtual disk. This causes the contents of the used disk and the contents of the virtual disk to become identical to each other.

Access to the virtual disk is started.

However, the two above-described data transfer techniques suffer from the following problem:

Both the two data transfer methods require a copying time proportional to the disk capacity. Therefore, it takes a longer time to transfer data stored in a disk device having a larger capacity. If the copying time is longer, extra processing load is placed on the computer to which the used disk is connected, resulting in a reduced processing efficiency of the entire system.

SUMMARY

According to an aspect of the embodiment, there is provided a computer-readable storage medium storing a virtual disk management program for causing a computer to carry out management of access to a storage device of which a storage area is divided into a plurality of slices for management, via a virtual disk, wherein the virtual disk management program causes the computer to carry out processing including; generating a virtual disk formed by a plurality of segments each having a same storage capacity as that of each slice, when a connection notice notifying connection of a storage device to be connected is received from a first disk node including the storage device to be connected in which data has already been stored; allocating one slice of a connected storage device other than the storage device to be connected to a predetermined one of the segments forming the virtual disk, as a data transfer destination slice; transmitting metadata for transferred data, which is indicative of a result of allocation of the data transfer destination slice, to a second disk node including the connected storage device; defining one slice of storage area in the storage device to be connected as a management information area, and transmitting a copy request for copying data in the management information area to the data transfer destination slice in the connected storage device, to the first disk node; allocating a plurality of slices obtained by dividing a storage area other than the one slice of storage area in the storage device to be connected, to segments other than the predetermined one of the slices of the virtual disk; transmitting a write request for writing metadata for existing data, which is indicative of correspondence between the slices of the storage device to be connected and the segments of the virtual disk, into the management information area, to the first disk node; and transmitting metadata for access, which is indicative of a relationship of allocation of slices to the segments of the virtual disk, to an access node for accessing the storage device to be connected and the connected storage device via the virtual disk.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWING(S)

FIG. 1 schematically illustrates an embodiment;

FIG. 7 illustrates an example of a data structure of a metadata storing section;

FIG. 8 illustrates an example of a data structure of a virtual disk metadata-storing section;

FIG. 13 illustrates a metadata table of a newly created virtual disk;

FIG. 14 illustrates metadata which has been changed in the disk nodes;

FIG. 16 illustrates a metadata table associated with the integrated storage device.

DESCRIPTION OF EMBODIMENT(S)

Figure 1:
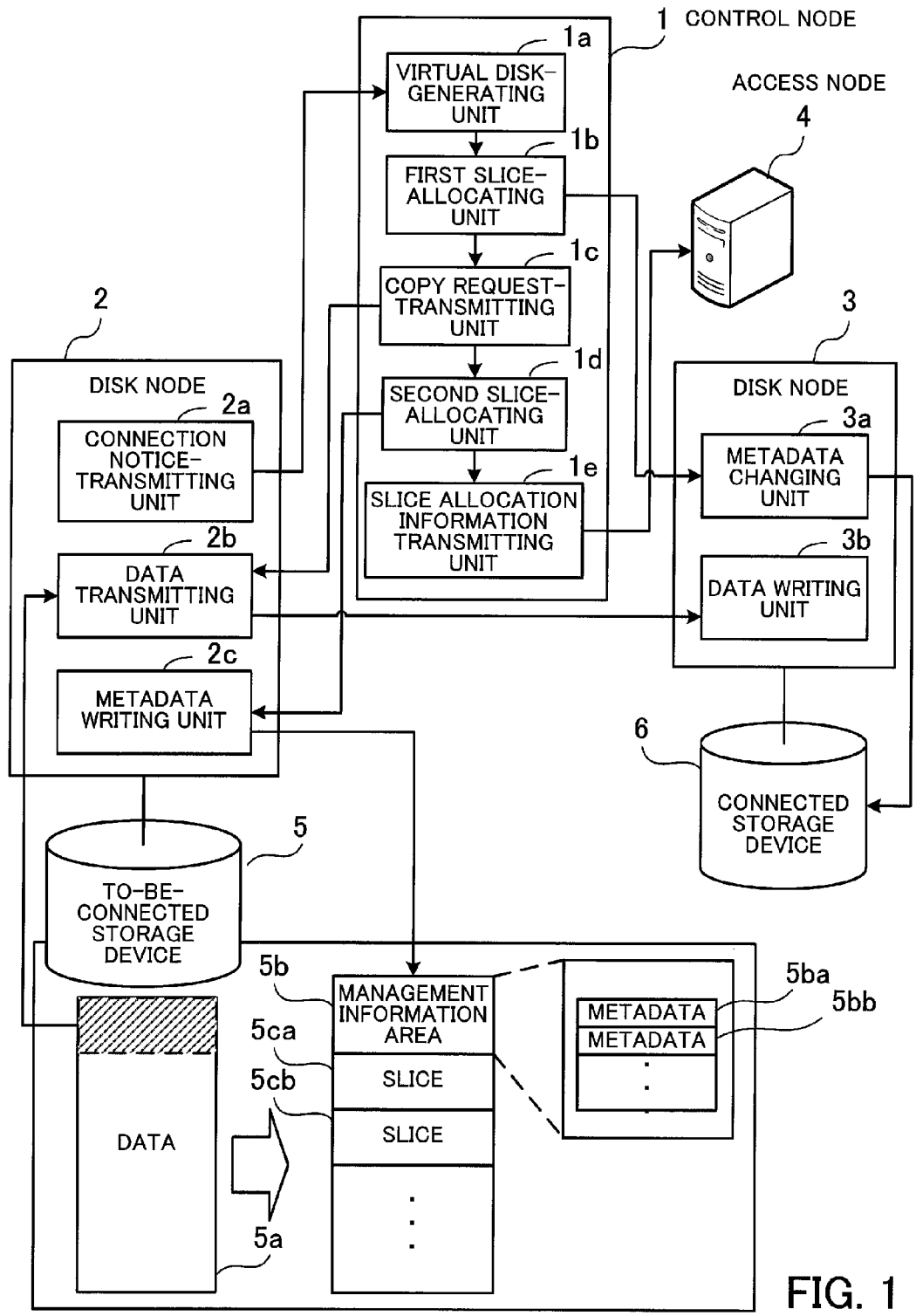

Embodiments of the present invention will be explained below with reference to the accompanying drawings, wherein like reference numerals refer to like elements throughout.

FIG. 1 schematically illustrates an embodiment. A multinode storage system includes a control node 1, disk nodes 2 and 3, and an access node 4. The control node 1 integrates a new storage device into the multinode storage system, creates and manages a virtual disk. The disk nodes 2 and 3 divide storage areas of storage devices connected thereto into a plurality of slices, and manage the same. The access node 4 accesses the storage devices provided in the multinode storage system via the virtual disk.

The disk node 2 includes a to-be-connected storage device (storage device to be connected) 5 in which data 5$a$ has already been stored. In the illustrated example in FIG. 1, it is assumed that the to-be-connected storage device 5 is newly integrated into the multinode storage system. The disk node 3 includes a connected storage device 6. The connected storage device 6 has already been integrated into the multinode storage system, and is in a state where slices can be allocated to the virtual disk.

To integrate the to-be-connected storage device 5 already storing the data 5$a$ into the multinode storage system, the nodes have the following capabilities:

The control node 1 includes a virtual disk-generating unit 1$a$, a first slice-allocating unit 1$b$, a copy request-transmitting unit 1$c$, a second slice-allocating unit 1$d$, and a slice allocation information-transmitting unit 1$e$. Upon reception of a connection notice notifying connection of the to-be-connected storage device 5 from the disk node 2, the virtual disk-generating unit 1$a$ generates a virtual disk which is formed by a plurality of segments each having the same storage capacity as each slice. The first slice-allocating unit 1$b$ allocates one slice of the connected storage device 6 to a predetermined one of the segments forming the virtual disk, as a data transfer destination slice. Further, the first slice-allocating unit 1$b$ transmits metadata for transferred data, which is indicative of a result of allocation of the data transfer destination slice, to the disk node 3 having the connected storage device 6. The copy request-transmitting unit 1$c$ defines one slice of storage area in the to-be-connected storage device 5 as a management information area 5$b$. Then, the copy request-transmitting unit 1$c$ transmits a copy request for copying data in the management information area 5$b$ to the data transfer destination slice of the connected storage device 6, to the disk node 2. The second slice-allocating unit 1$d$ allocates a plurality of slices which are obtained by dividing a storage area other than the predetermined one slice of storage area of the to-be-connected storage device 5 to the segments other than the predetermined one of the segments of the virtual disk. Then, the second slice-allocating unit 1$d$ transmits a write request for writing metadata 5$ba$, 5$bb$, . . . for the existing data, which is indicative of correspondence between the slices 5$ca$, 5$cb$, . . . of the to-be-connected storage device 5 and the segments of the virtual disk into the management information area. The slice allocation information-transmitting unit 1$e$ transmits metadata for use in access, which is indicative of a relationship of allocation of the slices to the segments of the virtual disk, to the access node 4 which accesses the to-be-connected storage device 5 and the connected storage device 6 via the virtual disk.

The disk node 2 includes a connection notice-transmitting unit 2$a$, a data transmitting unit 2$b$, and a metadata writing unit 2$c$. The connection notice-transmitting unit 2$a$ transmits the connection notice notifying the connection of the to-be-connected storage device 5 to the control node 1. When the copy request is received from the control node 1, the data transmitting unit 2$b$ transmits the data in the management information area 5$b$ to the disk node 3 to which the connected storage device 6 is connected. When the write request for writing the metadata 5$ba$, 5$bb$, . . . for the existing data, which is indicative of the correspondence between the slices 5$ca$, 5$cb$, . . . of the to-be-connected storage device 5 and the segments of the virtual disk, into the management information area 5$b$, is received from the control node 1, the metadata writing unit 2$c$ writes the metadata 5$ba$, 5$bb$, . . . for the existing data into the management information area 5$b$.

The disk node 3 includes a metadata changing unit 3$a$ and a data writing unit 3$b$. When the metadata for transferred data is received from the control node 1, the metadata changing unit 3a changes the metadata stored in the connected storage device 6 in association with the data transfer destination slice into the metadata for transferred data. Upon reception of the data in the management information area 5b from the disk node 2, the data writing unit 3b judges the transfer destination slice based on the metadata for transferred data and writes the received data into the transfer destination slice.

According to the above-described arrangement, the following processes are carried out.

First, the connection notice-transmitting unit 2a of the disk node 2 transmits a connection notice of the to-be-connected storage device 5 to the control node 1. For example, when it is detected that the to-be-connected storage device 5 is connected to the disk node 2, the connection notice-transmitting unit 2a transmits the connection notice. Then, the virtual disk-generating unit 1a of the control node 1 generates a virtual disk which is formed by a plurality of segments each having the same storage capacity as that of each slice. Next, the first slice-allocating unit 1b of the control node 1 allocates one slice of the connected storage device 6 to a predetermined one of the segments of the virtual disk, as a data transfer destination slice. Further, the first slice-allocating unit 1b transmits the metadata for transferred data, indicative of the allocation result to the disk node 3. In the disk node 3, upon reception of the metadata for transferred data, the metadata changing unit 3a changes the metadata stored in the connected storage device 6 in association with the data transfer destination slice into the metadata for transferred data.

Thereafter, the copy request-transmitting unit 1c of the control node 1 defines one slice of storage area in the to-be-connected storage device 5 as the management information area 5b, and transmits a request to the disk node 2, for copying the data in the management information area 5b to the data transfer destination slice of the connected storage device 6. Then, the data transmitting unit 2b of the disk node 2 transmits the data in the management information area 5b to disk node 3. In the disk node 3, the data writing unit 3b writes the data received from the disk node 2 into the data transfer destination slice.

Further, the second slice-allocating unit 1d of the control node 1 allocates a plurality of slices 5ca, 5cb, . . . obtained by dividing the storage area other than predetermined one slice of storage area of the to-be-connected storage device 5 to the segments other than the predetermined one of the virtual disk. Further, the second slice-allocating unit 1d transmits a request for writing metadata 5ba, 5bb, . . . for the existing data, which is indicative of correspondence between the slices 5ca, 5cb, . . . of the to-be-connected storage device 5 and the segments of the virtual disk, into the management information area 5b. In the disk node 2, upon reception of the write request from the control node 1, the metadata writing unit 2c writes the metadata 5ba, 5bb, . . . for the existing data into the management information area 5b.

Then, the slice allocation information-transmitting unit 1e of the control node 1 transmits the metadata for access, which is indicative of a relationship of allocation of the slices to the segments of the virtual disk, to the access node 4 which accesses the to-be-connected storage device 5 and the connected storage device 6 via the virtual disk.

As described above, one slice of data of the to-be-connected storage device 5 is copied to the other storage device, and the area from which data has been copied is defined as the management information area 5b. Then, the metadata 5ba, 5bb, . . . for the rest of the slices 5ca, 5cb, . . . is written into the management information area 5b. It should be noted that it is also possible to store discriminating information in the management information area 5b, which indicates that the to-be-connected storage device 5 has been integrated into the multinode storage system. The integration of the to-be-connected storage device 5 in the multinode storage system is completed by defining the virtual disk and setting the metadata of the slices allocated to the virtual disk. If the integration is completed, it becomes possible to access the data 5a stored in the to-be-connected storage device 5 via the virtual disk.

In the case of duplexing the data 5a stored in the to-be-connected storage device 5, a recovery process is started. The recovery process is a process for copying data from the slices (primary slices) which are allocated by the above-mentioned first slice-allocating unit 1b and the second slice-allocating unit 1d to slices (secondary slices) which are redundantly allocated to respective segments of the virtual disk. It should be noted that it is possible to access from the access node 4 to the primary slices even during the recovery process.

As described above, only by connecting the to-be-connected storage device 5 already storing the data to the disk node 2, it becomes possible to access the data as the virtual disk. Time taken for the transition is equal to the sum of time taken to change the metadata and time taken to copy the start slice, and does not depend on the size of the existing disk. If each slice (and hence the start slice) has a capacity of 1 GB, the data transfer can be completed within one minute. It should be noted that in cases where duplexing is required, the recovery process is started. Although the copying of a large amount of data occurs in the multinode storage system if the recovery process is carried out, the access can be performed even during the recovery process, and hence it is not necessary to stop the service.

In addition, not only internal data in the to-be-connected storage device 5, but also the to-be-connected storage device 5 itself is integrated into the multinode storage system. For this reason, the to-be-connected storage device 5 is not placed in an unused state after transferring the data to the virtual disk, which makes it possible to make efficient use of resources.

By the way, the to-be-connected storage device 5 and the connected storage device 6 illustrated in FIG. 1 may be a single disk device, or may be an RAID (Redundant Arrays of Inexpensive Disks) system in which multiple disk devices are integrated. If it is the RAID system, it is possible to enhance the reliability of data in a multiplied manner. In view of this, a detailed description will be given of the present embodiment, by taking, as an example, a case where the RAID system is used as a storage device, and data is duplexed using a plurality of disk nodes which are connected via the network.

Figure 2:
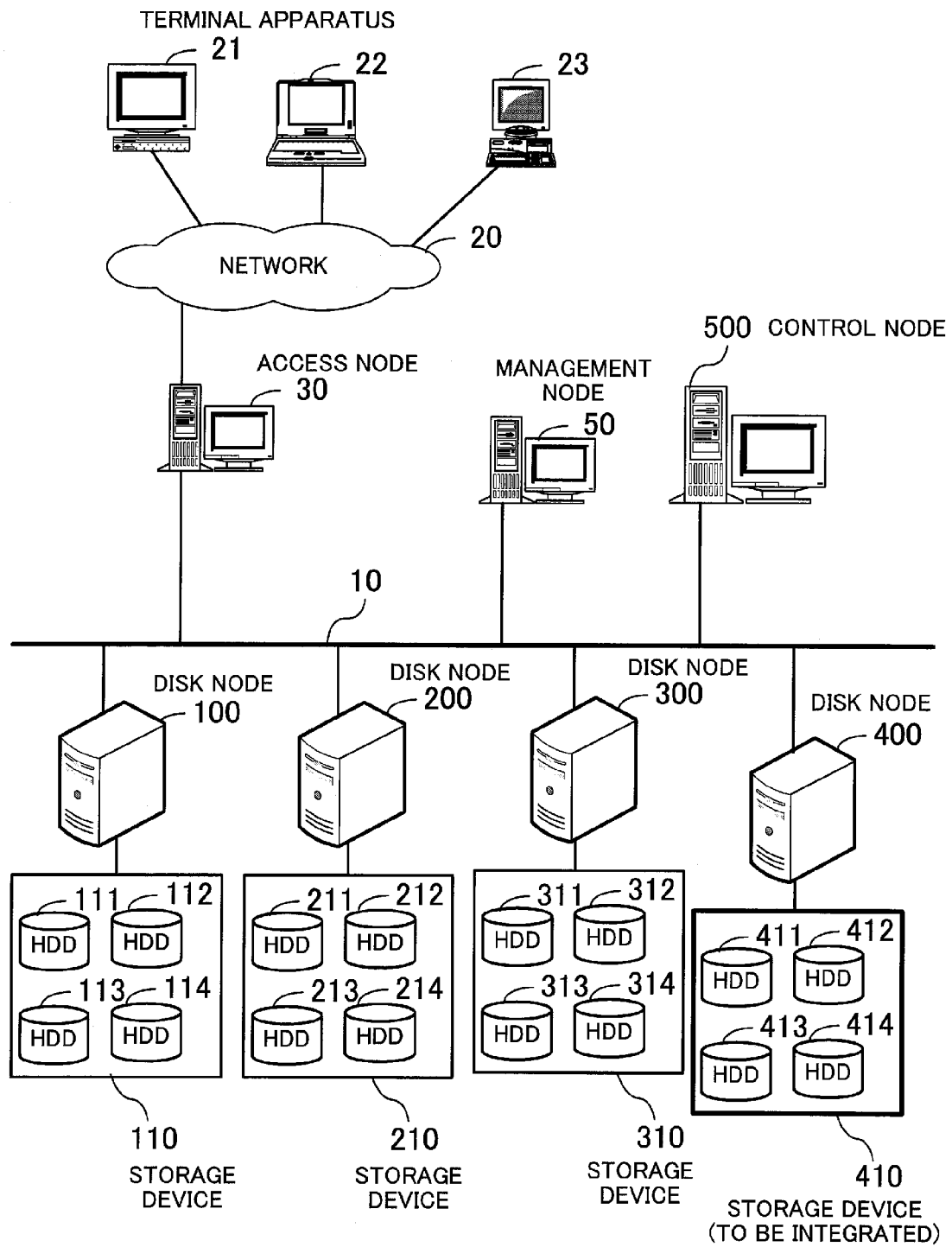
FIG. 2 illustrates an example of the configuration of a multinode storage system according to the present embodiment.

FIG. 2 illustrates an example of the configuration of the multinode storage system according to the present embodiment. In the multinode storage system according to the present embodiment, a plurality of disk nodes 100, 200, 300, and 400, a control node 500, an access node 30, and a management node 50 are connected via a network 10. Storage devices 110, 210, 310, and 410 are connected to the disk nodes 100, 200, 300, and 400, respectively.

A plurality of hard disk devices (HDD) 111, 112, 113, and 114 are mounted in the storage device 110. A plurality of HDDs 211, 212, 213, and 214 are mounted in the storage device 210. A plurality of HDDs 311, 312, 313, and 314 are mounted in the storage device 310. A plurality of HDDs 411, 412, 413, and 414 are mounted in the storage device 410. Each of the storage devices 110, 210, 310, and 410 is a RAID system using the HDDs integrated therein. In the present embodiment, each of the storage devices 110, 210, 310, and 410 provides a disk management service of RAID 5. In the present embodiment, it is assumed that the storage device 410 is newly integrated into the multinode storage system in use.

The disk nodes 100, 200, 300, and 400 are computers based on an architecture referred to as e.g. IA (Intel Architecture). The disk nodes 100, 200, 300, and 400 manage data stored in the connected storage devices 110, 210, 310, and 410, and provide the managed data to terminal apparatuses 21, 22, and 23 via the network 10. Further, the disk nodes 100, 200, 300, and 400 manage data having redundancy. That is, the same data is managed by at least two disk nodes.

The control node 500 manages the disk nodes 100, 200, 300, and 400. For example, when the control node 500 receives a connection notice of a new storage device from the disk nodes 100, 200, 300, and 400, the control node 500 defines a new virtual disk to make it possible to access the data stored in the storage device which is connected via the virtual disk.

The plurality of the terminal apparatuses 21, 22, and 23 are connected to the access node 30 via a network 20. The virtual disk is defined in the access node 30. Then, the access node 30 accesses corresponding data in the disk nodes 100, 200, 300, and 400, in response to a request for access to data on the virtual disk from any of the terminal apparatuses 21, 22 and 23.

The management node 50 is a computer used by an administrator for managing the operation of the multinode storage system. For example, the management node 50 collects information including the used amount of the virtual disk in the multinode storage system, and displays an operational status of the system on a screen.

Figure 3:
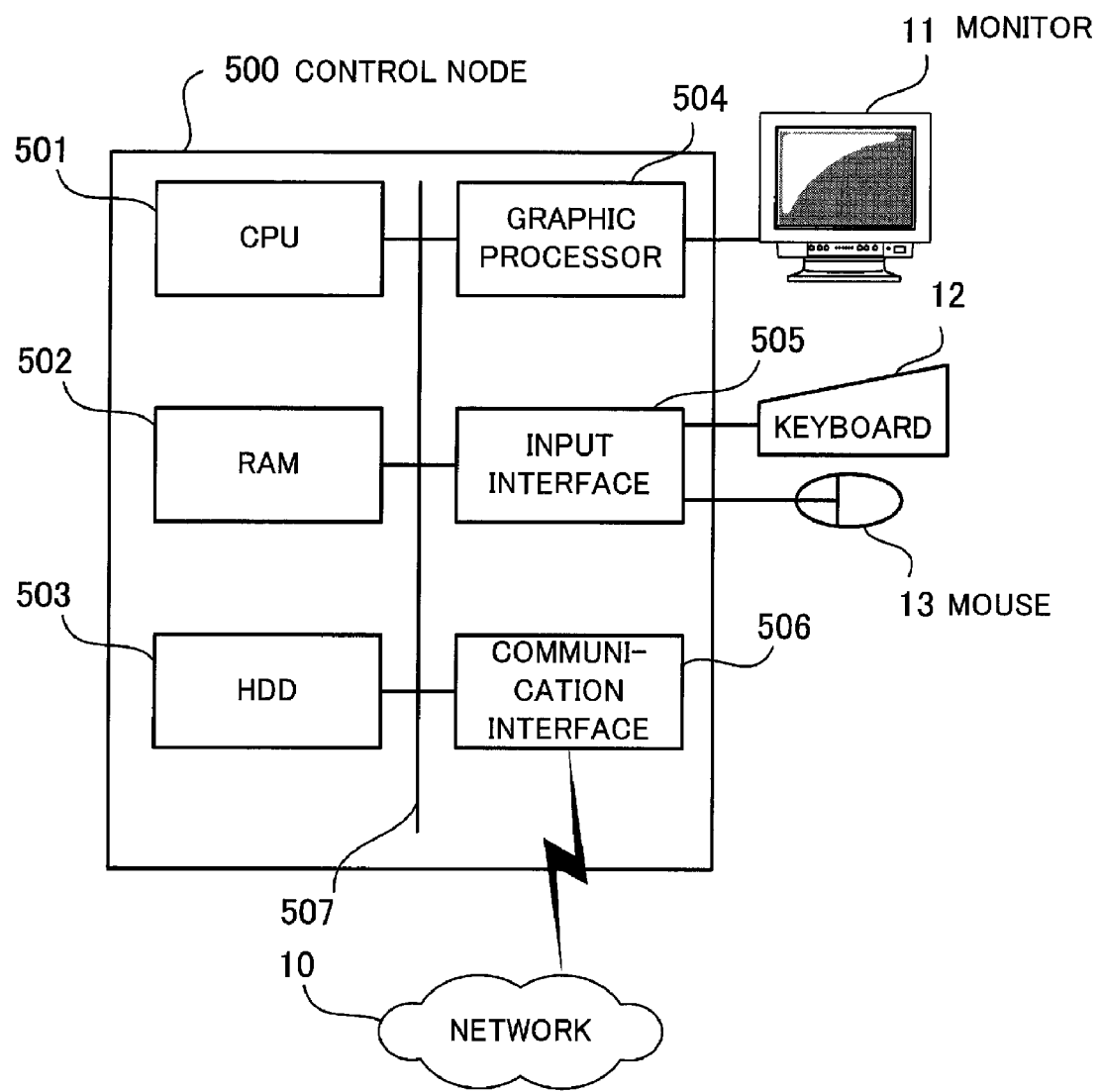
FIG. 3 illustrates an example of a hardware configuration of a control node.

FIG. 3 illustrates an example of a hardware configuration of the control node. The entire control node 500 is controlled by a CPU (Central Processing Unit) 501. A RAM (Random Access Memory) 502, a hard disk drive (HDD: Hard Disk Drive) 503, a graphic processor 504, an input interface 505, and a communication interface 506 are connected to the CPU 501 via a bus 507.

The RAM 502 is used as a main storage device of the control node 500. The RAM 502 temporarily stores at least part of a program of an OS and application programs which the CPU 501 is caused to execute. Further, the RAM 502 stores various data required by the CPU 501 for processing. The HDD 503 is used as a secondary storage device of the control node 500. The HDD 503 stores the program of the OS, the application programs, and various data. It should be noted that a semiconductor storage device such as a flash memory can be used as a secondary storage device.

A monitor 11 is connected to the graphic processor 504. The graphic processor 504 displays images on a screen of the monitor 11 according to commands from the CPU 501. The monitor 11 may be a display device using a CRT (Cathode Ray Tube) or a liquid crystal display device, for example.

A keyboard 12 and a mouse 13 are connected to the input interface 505. The input interface 505 transmits signals delivered from the keyboard 12 or the mouse 13 to the CPU 501 via the bus 507. The mouse 13 is an example of a pointing device, and any other suitable type of pointing device can be used. The other suitable types of the pointing device include a touch panel, a tablet, a touch pad, a track ball, and so forth.

The communication interface 506 is connected to the network 10, and exchanges data with other computers via the network 10.

With the hardware configuration described above, it is possible to realize processing functions of the present embodiment. Although FIG. 3 illustrates the hardware configuration of the control node 500, the disk nodes 100, 200, 300, and 400, the access node 30, and the management node 50 can each be realized by a similar hardware configuration.

In the illustrated example, the storage device 410 included in the disk node 400 is assumed to be newly added to the multinode storage system. Before addition of the storage device 410, it is possible to access the virtual disk that uses the storage devices 110, 210 and 310 from the access node 30.

Figure 4:
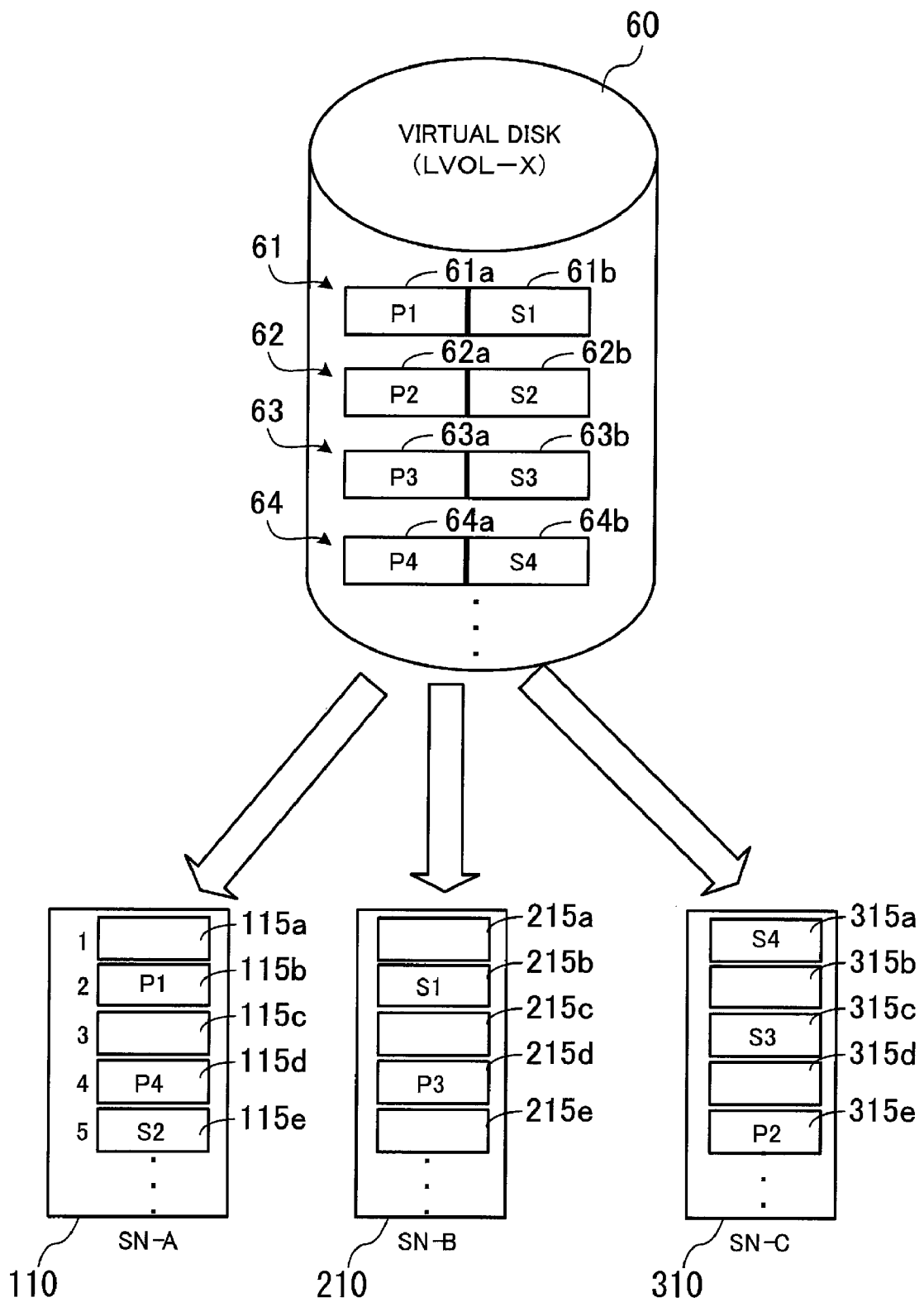
FIG. 4 illustrates data structure of a virtual disk.

FIG. 4 illustrates data structure of the virtual disk. In the present embodiment, a virtual disk identifier "LVOL-X" is given to a virtual disk 60. Node identifiers "SN-A", "SN-B", and "SN-C" are given to three disk nodes 100, 200, and 300 which are connected to each other via the network, for identification. Then, the storage devices 110, 210, and 310 which are connected to the disk nodes 100, 200, and 300, respectively, are uniquely identified on the network 10 by the respective node identifiers of the disk nodes 100, 200, and 300.

The storage system of the RAID 5 is constructed in each of the storage devices 110, 210, and 310 included in the respective disk nodes 100, 200, and 300. The storage capabilities provided by the storage devices 110, 210, and 310 are managed by dividing the storage devices 110, 210, and 310 into respective pluralities of slices 115a to 115e, 215a to 215e, and 315a to 315e.

The virtual disk 60 is formed by units of segments including segments 61 to 64. The storage capacity of each of the segments including the segments 61 to 64 is same as that of a slice which is a unit of management in the storage devices 110 and 210. For example, if the storage capacity of the slice is 1 gigabyte, the storage capacity of the segment is also 1 gigabyte. The storage capacity of the virtual disk 60 is equal to an integral multiple of a storage capacity per segment. The segments 61 to 64 are formed by respective pairs (slice pairs) of primary slices 61a, 62a, 63a, and 64a, and secondary slices 61b, 62b, 63b, and 64b.

Two slices which belong to one segment are associated with different disk nodes, respectively. In each of areas for managing respective slices, there is stored a flag storing a value indicative of a primary slice or a secondary slice, in addition to a virtual disk identifier, segment information, and information on a slice which forms the same segment.

In the illustrated example in FIG. 4, each slice identifier in the virtual disk 60 is represented by a combination of an alphabet "P" or "S", and a number. "P" represents a primary slice. "S" represents a secondary slice. The number following the alphabet represents a position of a segment in a segment sequence. For example, the primary slice 61a associated with the first segment 61 is indicated by "P1", while the secondary slice 61b associated with the same is indicated by "S1".

Figure 5:
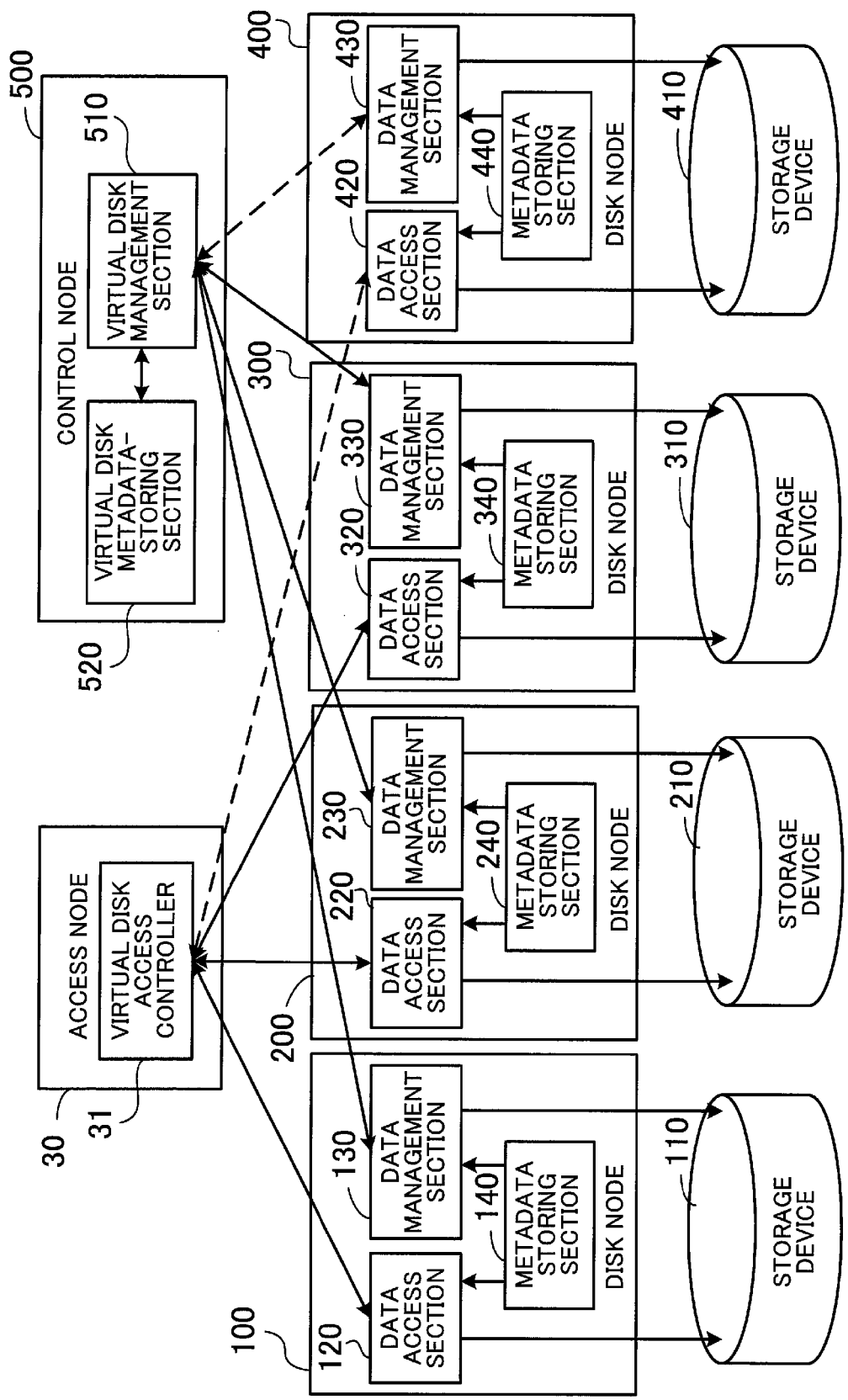
FIG. 5 is a functional block diagram of devices in the multinode storage system.

FIG. 5 is a functional block diagram of devices of the multinode storage system. The access node 30 includes a virtual disk access controller 31. In response to an access request from any of the terminal apparatuses 21, 22, and 23 which specifies data in the virtual disk 60, the virtual disk access controller 31 performs data access to a disk node which manages the specified data. Specifically, the virtual disk access controller 31 identifies a block in the virtual disk 60 storing data to be accessed, and then identifies a segment associated with the specified block. Further, the virtual disk access controller 31 refers to the metadata acquired in advance to thereby identify a disk node associated with a primary slice which forms the segment, and a slice in the identified disk node. Then, the virtual disk access controller 31 delivers a request for access to the identified slice, to the identified disk node.

The virtual disk access controller 31 of the access node 30 can access the storage device 410 connected to the disk node 400 only after the storage device 410 is integrated into the multinode storage system. Before the storage device 410 is integrated into the multinode storage system, the access node 30 directly accesses the storage device 410, not via the virtual disk. In this case, it is necessary for the application of the access node 30 to recognize the position of the storage device 410 on the network.

The control node 500 includes a virtual disk management section 510 and a virtual disk metadata-storing section 520.

The virtual disk management section 510 manages the slices in the storage devices 110, 210, 310, and 410 included in the disk nodes 100, 200, 300, and 400, respectively. For example, when the system is started, the virtual disk management section 510 transmits a metadata acquisition request to the disk nodes 100, 200, 300, and 400. Then, the virtual disk management section 510 generates virtual disk metadata from the metadata returned in response to the metadata acquisition request, and stores the same in the virtual disk metadata-storing section 520.

The virtual disk metadata-storing section 520 is a storage device for storing the virtual disk metadata generated based on the metadata collected from the disk nodes 100, 200, 300, and 400. For example, part of the storage area of the RAM 502 in the control node 500 is used as the virtual disk metadata-storing section 520.

The disk node 100 includes a data access section 120, a data management section 130, and a metadata storing section 140.

The data access section 120 accesses data stored in the storage device 110 in response to a request from the access node 30. Specifically, when a data reading request from the access node 30 is received, the data access section 120 acquires the data which is specified by the reading request from the storage device 110, and sends the same back to the access node which is a sender of the reading request. Further, when a data write request is received from the access node 30, the data access section 120 stores the data contained in the write request in the storage device 110.

If data is written by the data access section 120 in response to the write request, the data management section 130 of the disk node 100 cooperates with the data management section of a disk node which manages the secondary slice associated with the slice (primary slice) in which the data is written, to thereby update the data in the secondary slice. That is, the data management section 130 transmits the updated data to the disk node which manages the secondary slice. The data management section of the disk node having received the data writes the data in the secondary slice. This makes it possible to preserve consistency of the duplexed data.

Further, the data management section 130 transmits the metadata stored in the metadata storing section 140 to the virtual disk management section 510 in response to a metadata acquisition request from the virtual disk management section 510.

The metadata storing section 140 is a storage device for storing metadata. For example, part of the storage area in the RAM is used as the metadata storing section 140. It should be noted that the metadata stored in the metadata storing section 140 is stored in the storage device 110 when the system is shut down, and is read into the metadata storing section 140 when the system is started.

The other disk nodes 200, 300, and 400 have the same functions as those of the disk node 100. That is, the disk node 200 includes a data access section 220, a data management section 230, and a metadata storing section 240. The disk node 300 includes a data access section 320, a data management section 330, and a metadata storing section 340. The disk node 400 includes a data access section 420, a data management section 430, and a metadata storing section 440. Each of the elements in the disk nodes 200, 300, and 400 has the same function as that of each of the elements having the same name in the disk node 100.

Next, a detailed description will be given of the data structure in the storage device 110.

Figure 6:
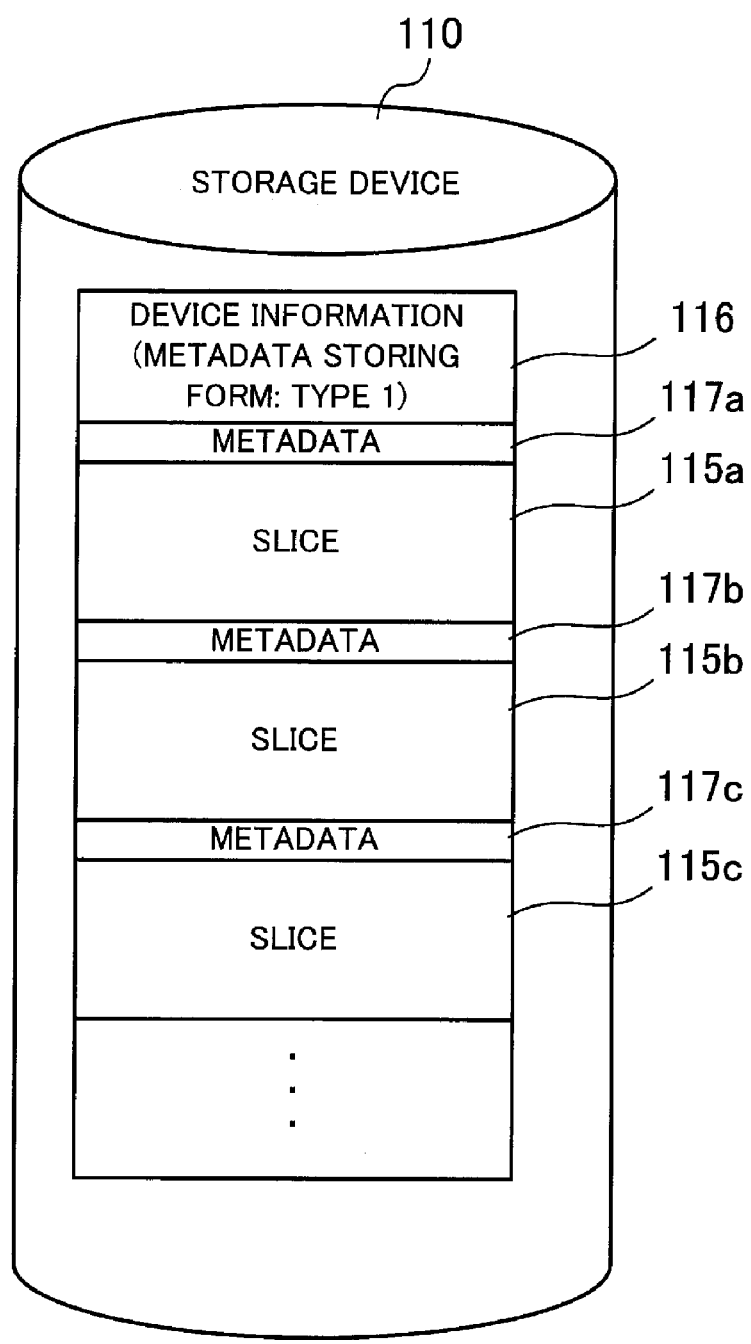
FIG. 6 illustrates an example of a data structure of a storage device.

FIG. 6 illustrates an example of the data structure of the storage device. The storage device 110 stores device information 116 and a plurality of metadata 117a, 117b, 117c, ... in addition to the slices 115a, 115b, 115c, ....

The device information 116 is used for management of the storage device 110. For example, the device information 116 includes information indicating that the storage device 110 has been integrated into the multinode storage system. Further, the device information 116 includes a metadata storing form. The metadata storing form is information which indicates whether each of the metadata 117a, 117b, 117c, ... is stored in a storage area which is continuous with the associated slice, or the metadata 117a, 117b, 117c, ... are collectively stored in a storage area which is separate from the slices. In the present embodiment, a metadata storing form in which each of the metadata 117a, 117b, 117c, ... is stored in a storage area continuous with the associated slice is defined as "type 1". Further, a metadata storing form in which the metadata 117a, 117b, 117c, ... are collectively stored in a storage area which is separate from the slices is defined as "type 2".

In the illustrated example in FIG. 6, a storage area which is continuous with each slice stores metadata associated with the slice. Therefore, the metadata storing form of the storage device 110 is type 1.

The metadata 117a, 117b, 117c, ... stored in the storage device 110 are read out by the data management section 130 when the disk node 100 is started, and are stored in the metadata storing section 140. The data management section 130 is capable of recognizing that each of the metadata 117a, 117b, 117c, ... of the storage device 110 is stored in the storage area which is continuous with each associated slice by referring to the metadata storing form contained in the device information 116.

FIG. 7 illustrates an example of a data structure of the metadata storing section. The metadata storing section 140 stores a metadata table 141. The metadata table 141 includes columns of a disk node ID, a slice ID, a status, a virtual disk ID, a segment ID, a virtual disk address, a paired disk node ID, and a paired slice ID. Pieces of information arranged in a lateral direction in the metadata table 141 are associated with each other to form one record indicative of a metadata item.

Identification information (disk node ID) of the disk node 100 which manages the storage device 110 is set in each box of the column of the disk node ID.

Identification information (slice ID) of each slice associated with an item of metadata in the storage device 110 is set in an associated box of the column of the slice ID.

A status flag indicative of the status of each slice is set in an associated box of the column of the status. If the slice is not allocated to any segment of the virtual disk, the status flag "F" is set. If the slice is allocated to the primary slice of a segment of the virtual disk, the status flag "P" is set. When the slice is allocated to the secondary slice of a segment of the virtual disk, the status flag "S" is set. If it is determined that the slice is allocated to a segment of the virtual disk, but the data has not been copied yet, the status flag "R" indicative of "reserved" is set.

Identification information (virtual disk ID) for identifying a virtual disk to which a segment associated with a slice belongs is set in an associated box of the column of the virtual disk ID.

An address indicative of the start of a segment to which the slice is allocated in the virtual disk is set in an associated box of the column of the virtual disk address.

Identification information (disk node ID) of a disk node which manages a storage device including a paired slice (another slice which belongs to the same segment) is set in an associated box of the column of the paired disk node ID.

Identification information (slice ID) for identifying a paired slice within a storage device to which the paired slice belongs is set in an associated box of the column of the paired slice ID.

The metadata stored in the metadata storing sections 140, 240, and 340 of the respective disk nodes 100, 200, and 300 is transmitted to the control node 500 in response to the request from the control node 500. In the control node 500, virtual disk metadata which defines allocation of the slices to the virtual disk 60 is created based on metadata collected from the disk nodes 100, 200, and 300. More specifically, the virtual disk management section 510 of the control node 500 groups collected metadata items by virtual disk ID. Then, the virtual disk management section 510 defines a group of metadata items having the same virtual disk ID as virtual disk metadata associated with the virtual disk indicated by the virtual disk ID. The created virtual disk metadata is stored in the virtual disk metadata-storing section 520.

FIG. 8 illustrates examples of a data structure of the virtual disk metadata-storing section. The virtual disk metadata-storing section 520 stores a virtual disk metadata table 521. The virtual disk metadata table 521 includes columns of a disk node ID, a slice ID, a status, a virtual disk ID, a segment ID, a virtual disk address, a paired disk node ID, and a paired slice ID. Pieces of information arranged in a lateral direction in the virtual disk metadata table 521 are associated with each other to form one record indicative of a metadata item. Information set in boxes of each column of the virtual disk metadata table 521 is the same kind of information as that set in boxes of each column having the same name in the metadata table 141.

Although in the illustrated example in FIG. 8, the metadata items of slices (two slices allocated to the same segment) which form one slice pair are arranged one above the other, it is not necessarily required to arrange the metadata items in that manner.

In the above-described system, the storage device 410 which has not been managed by the multinode storage system is integrated into the multinode storage system. For example, when the administrator connects the storage device 410 to the disk node 400, the disk node 400 detects the storage device 410 and starts a process for integration. The process for integrating the storage device 410 may be started by the administrator who provides an operational input to the disk node 400. Further, the system may be configured such that an instruction to incorporate the storage device 410 is issued from the management node 50 to the disk node 400 by the operational input to the management node 50 by the administrator, and the process for integrating the storage device 410 may be started in response to the instruction.

Here, in the disk node 400 in which the storage device 410 thereof starts to be integrated into the multinode storage system, the data management section 430 divides the storage area in the storage device 410 into slices, and sets up a storage area for metadata.

Figure 9:
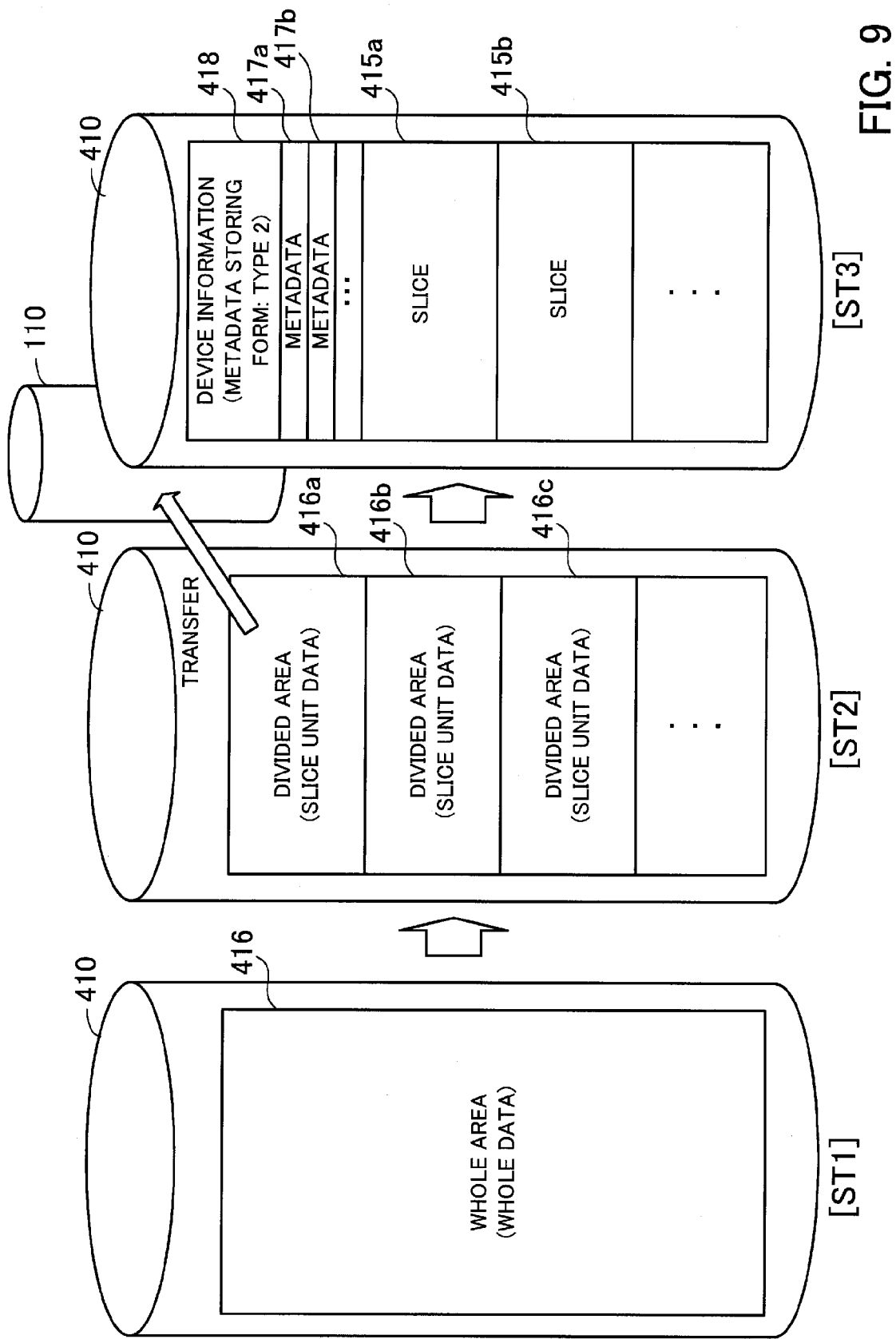
FIG. 9 illustrates an example of changes in the data structure of a storage device to be added.

FIG. 9 illustrates an example of changes in the data structure of a storage device to be added. A first status (ST1) indicates a state of the storage area of the storage device 410 before its data structure is changed. In the storage device 410 before being added to the multinode storage system, the data is stored in a manner distributed over the whole recordable area 416. As described above, the storage device 410 used in a state unintegrated into the multinode storage system is not provided with a storage area for information corresponding to the device information 116 and the metadata 117a, 117b, 117c, . . . illustrated in FIG. 6. Therefore, the data management section 430, first, divides the whole area 416 into a plurality of areas each corresponding to slice unitary data amount (e.g. 1 GB).

A second status (ST2) indicates a divided state of the storage area. As illustrated in FIG. 9, the whole area 416 is divided into a plurality of divided areas 416a, 416b, 416c, . . . . The size of each of the divided areas 416a, 416b, 416c, . . . is the same as that of each slice in the multinode storage system. Specifically, the data management section 430 defines addresses which are obtained by adding integral multiples of the number of addresses corresponding to the slice unitary data amount, to the start address of the whole area 416, as the respective start addresses of the divided areas 416a, 416b, 416c, . . . . Then, the data management section 430 recognizes that the storage area is divided into the plurality of the divided areas 416a, 416b, 416c, . . . , by the obtained start addresses as the boundaries. That is, it is only necessary for the data management section 430 to logically recognize the whole area 416 of the storage device 410 as the divided areas 416a, 416b, 416c, . . . , and it is not necessary to rewrite the data format or the like in the storage device 410.

In the present embodiment, the starting divided area 416a serves as a management information area for storing metadata and device information. Therefore, the data management section 430 copies the starting divided area 416a to another storage device (storage device 110 in the illustrated example in FIG. 9). Then, the data management section 430 creates metadata and the like.

A third status (ST3) indicates a state of the storage area after metadata is created. The metadata is created in the starting divided area 416a. The divided area 416a stores device information 418 and a plurality of metadata 417a, 417b, . . . . Further, the other divided areas 416b, 416c, . . . serve as slices to be managed 415a, 415b, . . . , respectively. The metadata items 417a, 417b, . . . are respectively associated with the slices 415a, 415b, . . . in one-to-one correspondence.

In addition to various statistical information, such as data access frequency in the storage device 410, the metadata storing form is registered in the device information 418. In the illustrated example in FIG. 9, since the metadata items 417a, 417b, . . . are collectively stored in the divided area 416a, the metadata storing form is type 2.

Change of the data structure of the storage device 410 as illustrated in FIG. 9 is performed by the data management section 430 of the disk node 400. Further, copying of the data in the starting divided area 416a to the other disk node, and creating of the metadata for managing the other divided areas 416b, 416c, . . . , as the slices, are performed under the control of the virtual disk management section 510 of the control node 500. A detailed description will be given, hereinafter, of the function provided with the multinode storage system, for adding an existing storage device.

Figure 10:
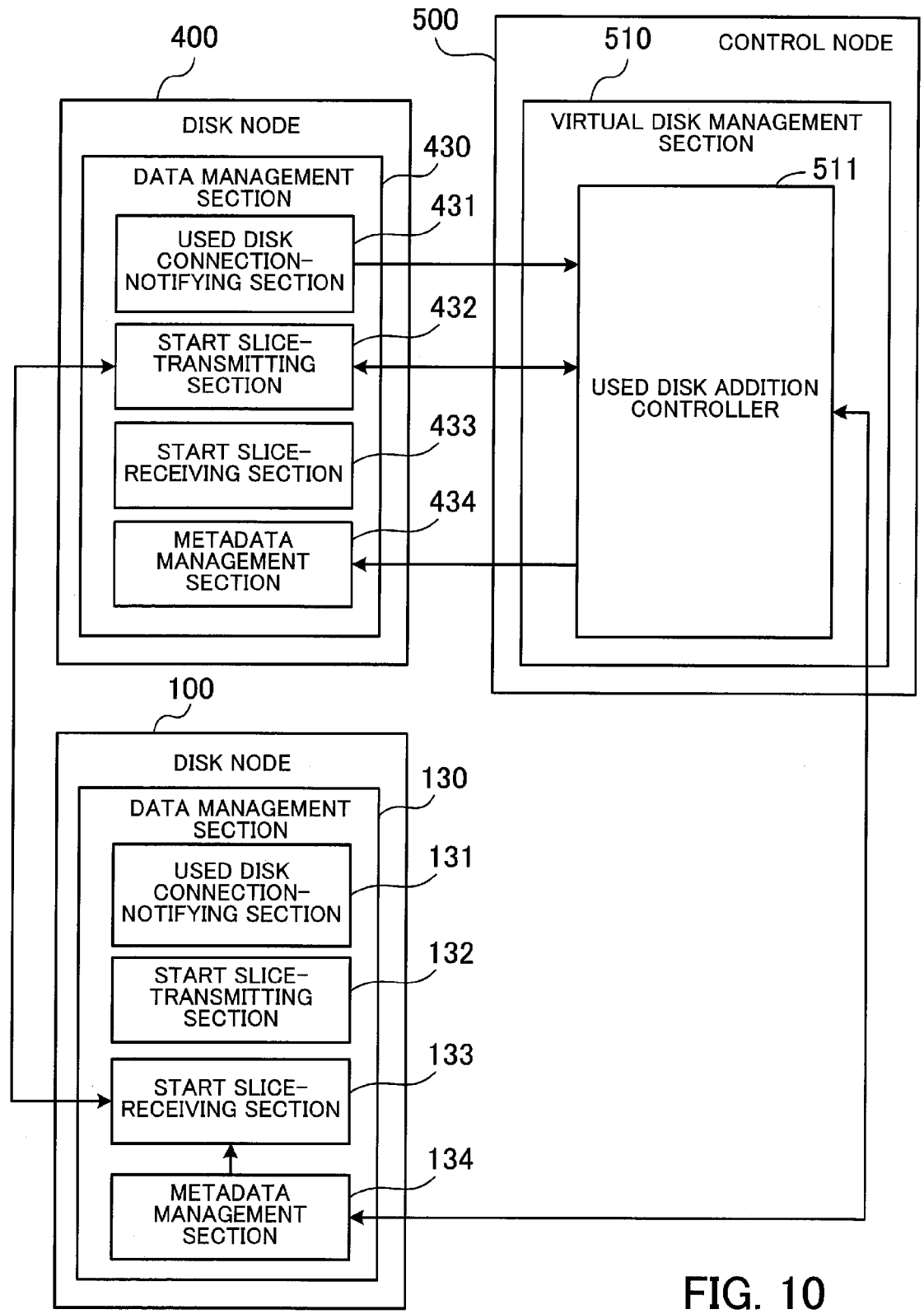
FIG. 10 is a block diagram illustrating additional functions of the existing storage device.

FIG. 10 is a block diagram illustrating the functions for adding an existing storage device. The connection relationship between the elements illustrated in FIG. 10 indicates relations concerning the input and output of information performed when data in the starting divided area in the existing storage device included in the disk node 400 is transferred to the storage device managed by the disk node 100.

The data management section 430 of the disk node 400 includes a used disk connection-notifying section 431, a start slice-transmitting section 432, a start slice-receiving section 433, and a metadata management section 434. The used disk connection-notifying section 431 notifies the control node 500 that the storage device already storing data is added to the multinode storage system. When the storage area of the storage device 410 is divided, the start slice-transmitting section 432 transfers data of a start slice formed at the time to the other disk node. When the existing storage device managed by the other disk node is added to the multinode storage system, and a predetermined slice of the disk node 400 is specified as a storing destination where data of a start slice of the existing storage device is to be stored, the start slice-receiving section 433 receives the data of the start slice.

The metadata management section 434 manages metadata in the storage device 410 and metadata in the metadata storing section 440. Specifically, when the storage device 410 is integrated into the multinode storage system, the metadata management section 434 stores the metadata of each of the slices 415a, 415b, . . . which are notified from the control node 500, in the storage device 410. If the storage device 410 which is integrated into the multinode storage system is unused (useful data is not stored), the metadata management section 434 can also store metadata in the metadata storing form of "type 1" as illustrated in FIG. 6. However, in the present embodiment, the storage device 410 is assumed to be a used one ("useful data is stored"), and hence the metadata management section 434 stores the metadata in the metadata storing form of "type 2" as illustrated in FIG. 9.

Further, the metadata management section 434 transfers the metadata stored in the storage device 410 to the metadata storing section 440. For example, after the storage device 410 is integrated into the multinode storage system, the metadata management section 434 refers to the device information 418 in the storage device 410 at the time of starting the disk node 400, and determines the metadata storing form. Next, the metadata management section 434 determines a storage area for metadata according to the metadata storing form to read out the metadata from the storage device 410. Then, the metadata management section 434 stores the read metadata in the metadata storing section 440.

Further, when an instruction for updating the metadata is received from the control node 500 during operation of the system, the metadata management section 434 updates the metadata in the storage device 410 and the metadata in the metadata storing section 440 according to the update instruction. The instruction for updating the metadata includes a metadata write request which instructs to write new metadata, and a metadata change request which instructs to change the contents of the existing metadata. If the reception of data of a start slice occurs according to the update of metadata, the metadata management section 434 notifies a slice as a destination where received data is to be written, to the start slice-receiving section 433.

The data management section 130 of the disk node 100 includes a used disk connection-notifying section 131, a start slice-transmitting section 132, a start slice-receiving section 133, and a metadata management section 134. The used disk connection-notifying section 131, the start slice-transmitting section 132, the start slice-receiving section 133, and the metadata management section 134 each have the same functions as those of each element having the same name in the disk node 400.

The virtual disk management section 510 of the control node 500 includes a used disk addition controller 511. The used disk addition controller 511 controls processing of integrating a used storage device in the multinode storage system. Specifically, when a connection notice of the used storage device is received from the disk node 400, the used disk addition controller 511 generates a virtual disk corresponding to the storage capacity of the connected used storage device 410. Further, the used disk addition controller 511 allocates slices to the generated virtual disk. If the virtual disk is generated according to the used storage device, a slice in a storage device different from the used storage device being added is allocated to the start segment as its primary slice. The slices in the storage device to be connected are allocated to the segments other than the start segment as their primary slices.

When the slice allocation is completed, the used disk addition controller 511 creates a virtual disk metadata table in association with the used storage device 410 and stores the same in the virtual disk metadata-storing section 520. Then, the used disk addition controller 511 instructs the disk node which manages the slices allocated to the virtual disk to update the metadata. Further, the used disk addition controller 511 notifies the disk node 400 of a request for copying data to the slice which is allocated to the start segment of the generated virtual disk as the primary slice. When copying of the data to the start segment of the generated virtual disk is completed, and the metadata of at least the primary slices in the disk nodes 100, 200, 300, and 400 is updated, it becomes possible to access the generated virtual disk from the access node 30. Accordingly, the used disk addition controller 511 transmits the metadata of the generated virtual disk to the access node 30. This makes it possible to cause the access node 30 to recognize the new virtual disk, and thereafter perform the data access via the virtual disk.

The correspondence between the functions of each node and the functions illustrated in FIG. 10 is as follows. The used disk addition controller 511 has the functions of the control node 1. The used disk connection-notifying sections 131 and 431 of the disk nodes 100 and 400 have the functions of the connection notice-transmitting unit 2a of the disk node 2. The start slice-transmitting sections 132 and 432 of the disk nodes 100 and 400 have the functions of the data transmitting unit 2b of the disk node 2. The metadata management sections 134 and 434 have the functions of the data writing unit 2c of the disk node 2 and the metadata changing unit 3a of the disk node 3. The start slice-receiving sections 133 and 433 of the disk nodes 100 and 400 have the functions of the data writing unit 3b of the disk node 3.

Next, a description will be given of a process for integrating the used storage device 410 into the multinode storage system, by the configuration illustrated in FIG. 10.

Figure 11:
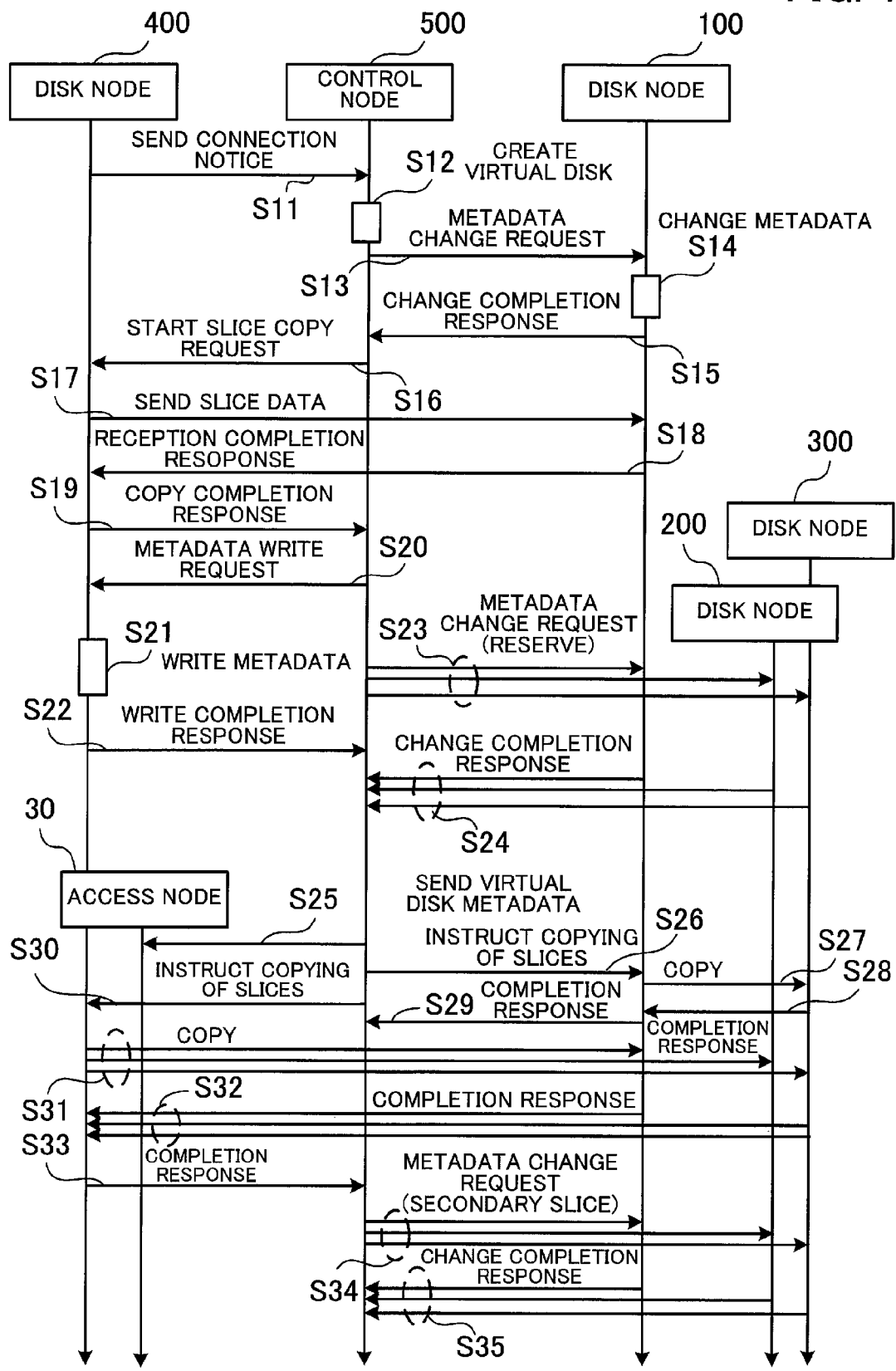
FIG. 11 is a sequence diagram of a used storage device-integrating process.

FIG. 11 is a sequence diagram of the used storage device-integrating process. The process illustrated in FIG. 11 will be described hereinafter in the order of step numbers.

In step S11, the used disk connection-notifying sections 431 of the disk node 400 transmits a connection notice to the control node 500 in response to an operational input for instructing to incorporate the storage device 410 into the multinode storage system. This connection notice contains information indicative of the disk node ID of the disk node 400 and the storage capacity of the storage device 410.

In step S12, in the control node 500, the used disk addition controller 511 receives the connection notice. The used disk addition controller 511 generates a virtual disk in association with the storage device 410 which is identified by the connection notice. At this time, it is assumed that a slice in the storage device 110 which is managed by the disk node 100 is allocated as the primary slice of a start segment of the newly generated virtual disk.

In step S13, the used disk addition controller 511 transmits a metadata change request to the disk node 100. This metadata change request contains metadata related to the slice allocated as the primary slice of the start segment of the newly created virtual disk.

In step S14, the metadata management section 134 of the disk node 100 changes the metadata in response to the metadata change request. Specifically, the metadata management section 134 changes the metadata of the slice allocated to the start segment of the created virtual disk to contents specified by the metadata change request.

In step S15, the metadata management section 134 transmits a change completion response indicating that change of the metadata has been completed, to the control node 500.

In step S16, the used disk addition controller 511 of the control node 500 transmits a start slice copy request to the disk node 400. The start slice copy request contains the disk node ID and the slice ID specifying a slice as a copying destination. It should be noted that the slice as the copying destination is the slice allocated to the start segment of the virtual disk as the primary slice.

In step S17, the start slice-transmitting section 432 of the disk node 400 transmits the data stored in the starting divided area 416a (see FIG. 9) of the storage device 410 to the disk node 100 specified by the start slice copy request.

In step S18, the start slice-receiving section 133 of the disk node 100 receives the data transmitted from the disk node 400. Next, the start slice-receiving section 133 acquires a slice number of the slice allocated to the start segment of the newly created virtual disk from the metadata management section 134. Then, the start slice-receiving section 133 stores the received data in the slice having the slice number acquired from the metadata management section 134. When the receiving and writing of the data are completed, the start slice-receiving section 133 transmits a reception completion response to the disk node 400.

In step S19, when the reception completion response is received, the start slice-transmitting section 432 of the disk node 400 deletes the data in the divided area 416a. Next, the start slice-transmitting section 432 transmits a copy completion response to the control node 500.

In step S20, the used disk addition controller 511 of the control node 500 transmits a metadata write request to the disk node 400. The metadata write request contains metadata related to slices allocated to the newly created virtual disk.

In step S21, The metadata management section 434 of the disk node 400 writes the metadata into the storage device 410 in response to the metadata write request. Specifically, after deleting the data in the start divided area 416a (see FIG. 9), the metadata management section 434 writes the metadata indicated by the metadata write request into the start divided area 416a. When writing the metadata into the storage device 410 is completed, the metadata management section 434 stores the metadata in the metadata storing section 440.

In step S22, when the writing of the metadata into the storage device 410 and the storing of the same in the metadata storing section 440 are completed, the metadata management section 434 transmits a write completion response to the control node 500.

In step S23, the used disk addition controller 511 of the control node 500 transmits a metadata change request to the disk nodes 100, 200, and 300. This metadata change request contains metadata indicating that slices allocated as secondary slices of the newly created virtual disk are to be placed in a reserved state. The disk nodes 100, 200, and 300 change the metadata in response to the metadata change request. Specifically, the disk nodes 100, 200, and 300 write the metadata contained in the metadata change request into the storage devices 110, 210, and 310, and store the same in the metadata storing sections 140, 240, and 340.

In step S24, when the change of the metadata is completed, the disk nodes 100, 200, and 300 each transmit a change completion response to the control node 500. This causes the slices in the storage devices 110, 210, and 310 to serve as reserved slices to be used as secondary slices of the newly created virtual disk. Each reserved slice is recognized as an allocated slice when an unused slice is searched for when allocating a slice.

In step S25, the used disk addition controller 511 of the control node 500 transmits the metadata of the newly created virtual disk to the access node 30. At this time, only the metadata related to the primary slices is transmitted. The access node 30 can recognize the existence of the new virtual disk and the slices allocated to the virtual disk by receiving the metadata. Although the access node 30 has been performing access by specifying an address of the storage device 410 of the disk node 400, hereafter access is performed via the newly created virtual disk.

In step S26, the used disk addition controller 511 of the control node 500 transmits a slice copying instruction concerning the start segment of the newly created virtual disk to the disk node 100 which manages the primary slice of the start segment.

In step S27, the disk node 100 copies the data of the slice allocated to the start segment of the newly created virtual disk to the reserved slice of the segment. In the illustrated example in FIG. 11, the disk node 300 is assumed to have an associated reserved slice, and hence the disk node 100 transmits the slice data to the disk node 300. The disk node 300 stores the received data in the reserved slice.

In step S28, when the receiving and storing of the data in the reserved slice are completed, the disk node 300 transmits a completion response to the disk node 100.

In step S29, when the completion response is received from the disk node 300, the disk node 100 transmits a copying completion response to the control node 500.

In step S30, the used disk addition controller 511 of the control node 500 transmits a slice copying instruction concerning segments other than the start segment of the newly created virtual disk to the disk node 400 which manages the primary slices of the segments in parallel with the step S26.

In step S31, the disk node 400 copies the data of the slices allocated to the segments other than the start segment of the newly created virtual disk to the reserved slices of the segments. In the illustrated example in FIG. 11, the disk nodes 100, 200, and 300 are assumed to have associated reserved slices, and hence the disk node 400 transmits slice data to the disk nodes 100, 200, and 300. The disk nodes 100, 200, and 300 store the received data in the reserved slices.

In step S32, when the receiving and storing of the data in the reserved slice are completed, the disk nodes 100, 200, and 300 transmit respective completion responses to the disk node 400.

In step S33, when the completion responses are received from the disk nodes 100, 200, and 300, the disk node 400 transmits a copy completion response to the control node 500.

Through reception of the copy completion responses from the disk nodes which manage the primary slices of the newly created virtual disk, the used disk addition controller 511 of the control node 500 recognizes that the reserved slices are ready for use as the secondary slices.

In step S34, the used disk addition controller 511 of the control node 500 transmits metadata change requests to the disk nodes 100, 200, and 300, respectively. These metadata change requests contain metadata according to which specified slices are placed in a status of the secondary slice. The disk nodes 100, 200, and 300 change the metadata according to the respective metadata change requests. Specifically, the disk nodes 100, 200, and 300 write metadata items contained in the metadata change requests thereto into the respective storage devices 110, 210, and 310, and store the same in the metadata storing sections 140, 240, and 340.

In step S35, upon completion of change of the metadata, the disk nodes 100, 200, and 300 transmit respective change completion responses to the control node 500. This completes duplexing of the data of the newly created virtual disk.

As described above, in the multinode storage system, it becomes possible to access the data stored in the storage device 410 via the virtual disk. During a time period from the time the data in the divided area 416*a* is deleted in step S21 to the time the virtual disk metadata is transmitted in step S25, access to the data in the divided area 416*a* from the access node 30 causes an error. However, it is possible to transmit the virtual disk metadata to the access node 30 in the step S25 without receiving the write completion response in the step S22. Therefore, the time period during which the data in the divided area 416*a* may not be accessed is over in a very short time.

Next, a detailed description will be given of a virtual disk creation process (step S12).

Figure 12:
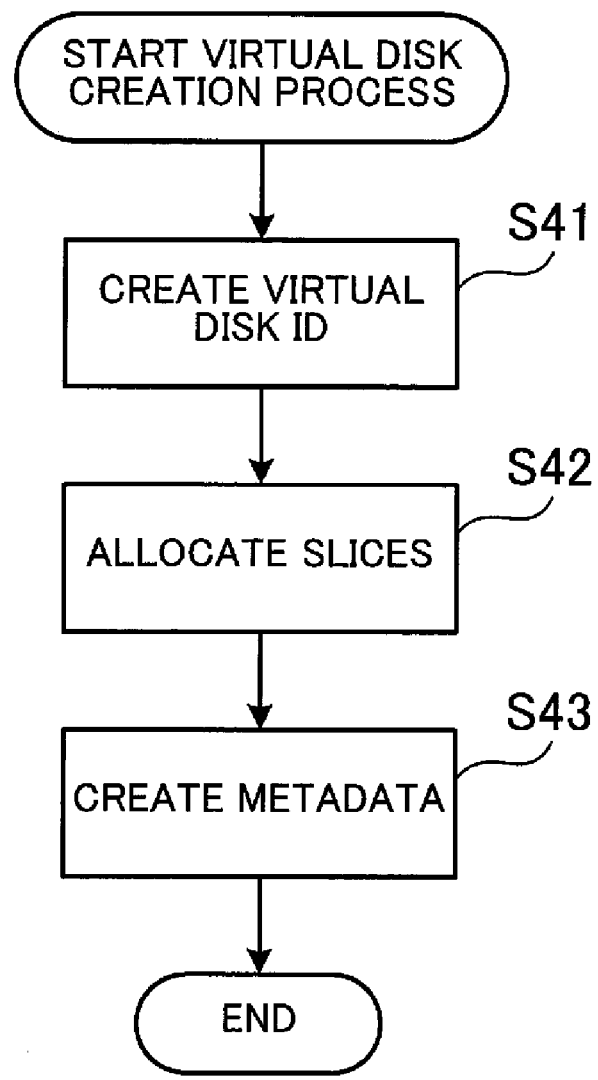
FIG. 12 is a flowchart of a virtual disk creation process.

FIG. 12 is a flowchart of the virtual disk creation process. The process in FIG. 12 will be described hereinafter in the order of step numbers.

In step S41, when a connection notice is received, the used disk addition controller 511 generates a virtual disk. That is, the used disk addition controller 511 creates a virtual disk ID "LVOL-Y" which is different from the virtual disk already generated.

In step S42, the used disk addition controller 511 defines segments which corresponds in a total size to the storage capacity specified by the connection notice, and allocates a primary slice and a secondary slice to each of the segments. A slice of the storage device different from the used storage device 410 is allocated to the start segment as its primary slice. The slices of the used storage device 410 are allocated to the segments other than the start segment as their primary slices.

In step S43, the used disk addition controller 511 creates metadata associated with the slices allocated in step S42. For example, if the storage capacity of the storage device is 100 GB and the size of each slice is 1 GB, the used disk addition controller 511 creates metadata of 100 slices. The created metadata is stored in the virtual disk metadata-storing section 520.

FIG. 13 illustrates a virtual disk metadata table which is newly created. The disk node ID of the disk node 400 is "SN-D".

The metadata of the slices allocated to the segments corresponding to the capacity of the used storage device 410 is registered in a newly created virtual disk metadata table 522. The virtual disk ID of each metadata is "LVOL-Y". An unused slice of the storage device other than the storage device 410 is allocated to the primary slice of the start segment (segment ID "1"). In the illustrated example in FIG. 13, the first slice (slice ID "1") of the storage device 110 which is managed by the disk node 100 having the disk node ID "SN-A" is allocated to the primary slice of the start segment. Slices of the storage device 410 are allocated to the primary slices of the second and subsequent segments, respectively.

Metadata items of the status "R" are created for slices allocated to the secondary slices. The status of these metadata items is changed into "S" after completion of copying of data from the primary slices to the secondary slices.

Further, when the virtual disk is generated, slice IDs are set to the slices 415*a*, 415*b*, . . . (see FIG. 9) of the storage device 410. Each slice ID is generated so as to be unique in the disk node 400. Slices of other storage devices than the storage device 410 are allocated to the secondary slices of the respective segments.

The slice allocation to the newly created virtual disk is defined according to the above-described virtual disk metadata table 522. Then, a metadata change request containing metadata having a segment ID of "1" is transmitted to the disk node 100 having the disk node ID "SN-A" (step S13 in FIG. 12). Then, associated metadata in the disk node 100 is changed.

FIG. 14 illustrates metadata items which have been changed in the disk nodes. As is apparent from a comparison with the status before the change illustrated in FIG. 7, a metadata item having a slice ID of "1" in the metadata table 141 (record at the top of the metadata table 141) has been changed. The changed metadata item indicates that the start slice (slice ID "1") of the storage device 110 is allocated to the primary slice (status "P") of the start segment (segment ID "1") of the newly created virtual disk (virtual disk ID "LVOL-Y").

Although the metadata in the metadata storing section 140 is illustrated in FIG. 14, the metadata in the storage device 110 is also changed. Specifically, the metadata item having the slice ID "1" in the metadata table 141 is written into the storage device 110 as the metadata 117*a* of the start slice 115*a* illustrated in FIG. 6.

As described above, the associated metadata item in the disk node 100 which manages the slice allocated to the start segment of the virtual disk is updated. Thereafter, the data stored in the start divided area 416*a* of the storage device 410 is transferred from the disk node 400 to the disk node 100, and the data is stored in the slice allocated to the start segment of the virtual disk.

In the disk node 400, after transmission of the data in the divided area 416*a* to the disk node 100, associated metadata is written into the divided area 416*a* (step S21 in FIG. 12).

Figure 15:
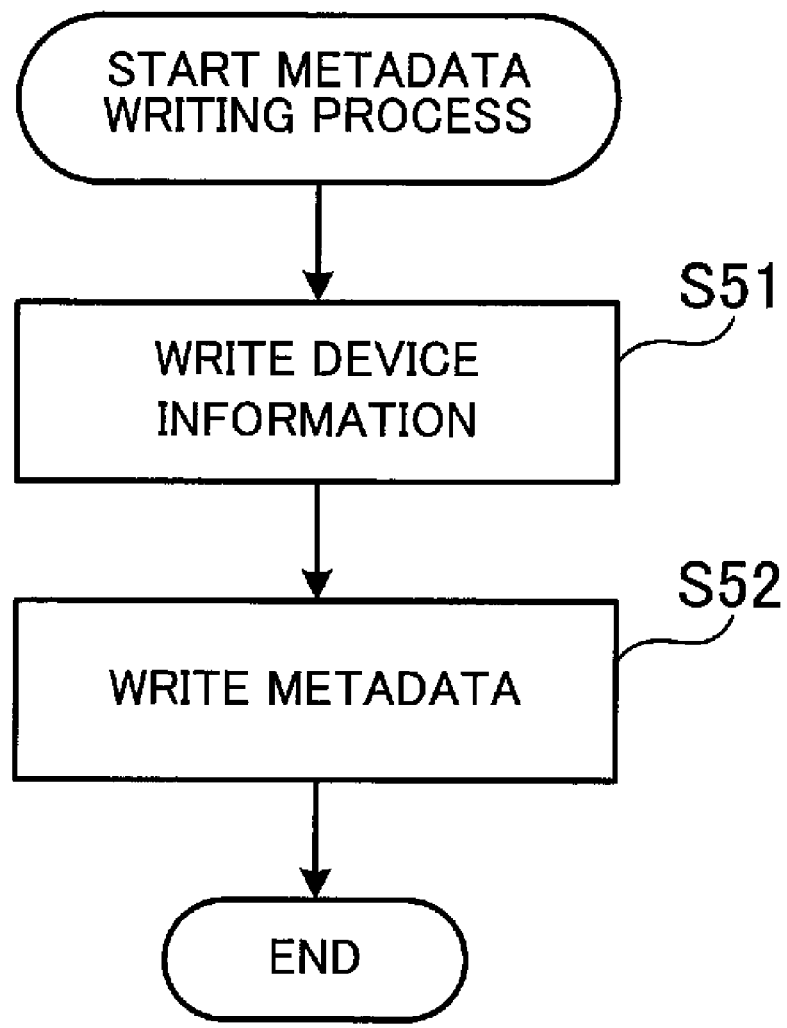
FIG. 15 is a flowchart of a metadata writing process.

FIG. 15 is a flowchart of a metadata writing process. Hereafter, the process in FIG. 15 will be described along with step numbers.

In step S51, the metadata management section 434 of the disk node 400 writes the device information 418 into the divided area 416*a*. The device information 418 contains the metadata storing form (type 2) which indicates metadata items are collectively stored in the start of the disk.

In step S52, the metadata management section 434 writes the metadata items 417*a*, 417*b*, . . . associated with the respective slices 415*a*, 415*b*, . . . into the divided area 416*a*, in succession to the device information 418. Further, the metadata management section 434 stores the metadata items 417*a*, 417*b*, . . . in a metadata table in the metadata storing section 440.

FIG. 16 illustrates a metadata table associated with the integrated storage device. The metadata storing section 440 of disk node 400 stores a metadata table 441 in which the metadata items of the storage device 410 are registered. As illustrated in FIG. 16, immediately after the storage device 410 is integrated into the multinode storage system, the slices are allocated as the primary slices of the virtual disk having the ID "LVOL-Y". The metadata having the same contents as those of the metadata table 441 is written into the divided area 416*a* serving as a management information area.

When the metadata items of the slices allocated to the virtual disk having the ID "LVOL-Y" are stored in the disk nodes, the data is copied from the primary slices to the reserved slices. When the copying of the data is completed, the status of each reserved slice is changed to the secondary slice. From then on, data which is input to the virtual disk having the ID "LVOL-Y" is managed in a manner duplexed in the plurality of the disk nodes.

Figure 17:
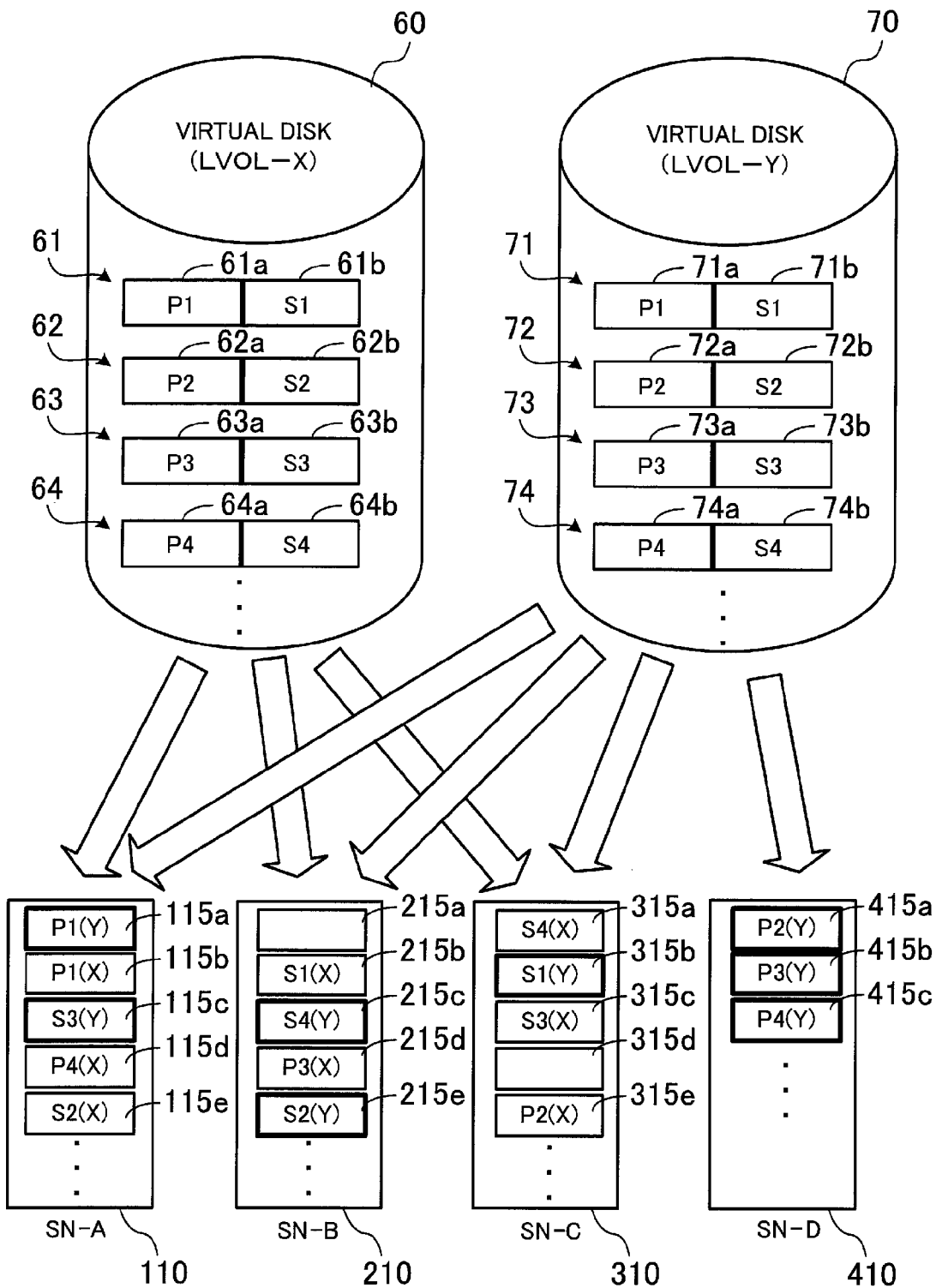
FIG. 17 illustrates a relationship of slice allocation after the used storage device is integrated.

FIG. 17 illustrates a relationship of the slice allocation after integrating the used storage device. A virtual disk 70 is generated by newly having integrated the storage device 410 in the multinode storage system. The segments 71, 72, 73, 74, . . . are formed by respective pairs of primary slices 71a, 72a, 73a, 74a, . . . and secondary slices 71b, 72b, 73b, 74b, . . . . Slices in the storage devices 110, 210, 310, 410 are allocated to the primary slices 71a, 72a, 73a, 74a, . . . and the secondary slices 71b, 72b, 73b, 74b, . . . . Further, the slices 415a, 415b, 415c, . . . of the storage device 410 having been newly integrated in the system are respectively allocated to the segments 72, 73, 74 of the virtual disk 70 as their primary slices.

In the illustrated example in FIG. 17, similarly to FIG. 4, an identifier of each slice in the virtual disks 60 and 70 is represented by a combination of an alphabet "P" or "S" and a number. "P" represents a primary slice. "S" represents a secondary slice. The number following the alphabet represents a position of a segment in a segment sequence.

Further, a symbol in parentheses following the identifier of each slice of each of the storage devices 110, 210, 310, 410 represents the virtual disk to which the slice is allocated. Slices indicated using "X" in parentheses are allocated to the virtual disk 60 having a virtual disk ID of "LVOL-X". Slices indicated using "Y" in parentheses are allocated to the virtual disk 70 having a virtual disk ID of "LVOL-Y".

As described above, it is possible to integrate the used storage device 410 in the multinode storage system. At this time, if processing of data transmission and metadata update of one slice is completed, it becomes possible to access the data stored in the storage device 410 from the access node 30. That is, if the virtual disk 70 is created, the metadata concerning the primary slices allocated to the segments of the virtual disk 70 is notified from the control node 500 to the access node 30. The access node 30 recognizes that the virtual disk 70 has been newly created according to the received metadata. When data access by specifying the address of the virtual disk 70 occurs, the access node 30 determines a segment to which the data to be accessed belongs, and the primary slice allocated to the segment by referring to the metadata. Then, the access node 30 transmits a data access request specifying the corresponding slice, to the disk node which manages the slice.

In the present embodiment, it is only required to copy data in one slice. Therefore, even if the storage device 410 has a large storage capacity, it takes a short time to copy the data. Further, since it is only required to copy data in one slice, processing load on the disk node due to copying of data is light.

Furthermore, the storage device 410 itself is integrated into the multinode storage system. Therefore, a time period during which the storage device 410 is not in use is not caused, whereby resource use efficiency is enhanced. And what is more, if the allocation of primary slices is completed, it becomes possible to access the data in the virtual disk 70 from the access node 30. Therefore, it is possible to access data before duplexing of the data (copying of the data from the primary slices to the secondary slices) is completed, which realizes a short out-of-service time.

It should be noted that it is possible to realize the above-described function of processing by a computer. In this case, a program in which content of processing of function to be included in the disk node or the control node is written is provided. By carrying out the program by the computer, the above-described function of processing is realized on the computer. The program in which the content of processing is written can be recorded in a record medium which is capable of being read by the computer. Examples of the record medium which is capable of being read by the computer include a magnetic recording system, an optical disk, a magnetooptical medium, a semiconductor memory or the like. Examples of the magnetic recording system include a hard disk device (HDD), a flexible disk (FD), a magnetic tape. Examples of the optical disk include a DVD (Digital Versatile Disc), a DVD-RAM, a CD-ROM (Compact Disc Read Only Memory), a CD-R (Recordable)/RW (ReWritable). Examples of the magnetooptical medium include an MO (Magneto-Optical disc).

In case of distributing programs, for example, portable record mediums, such as DVD, CD-ROM or the like in which the program is recorded are marketed. Further, it is also possible to store the program in a storing device of a server computer, and transfer the program from the server computer to the other computer via a network.

The computer which carries out the program stores, for example, the program which is recorded in the portable record medium, or is transferred from the server computer in the storing device thereof. Then, the computer reads out the program from the storing device thereof, and carries out the processes according to the program. It should be noted that the computer is also capable of directly reading out the program from the portable record medium, and carrying out the processes according to the program. Further, the computer is also capable of carrying out the processes according to the program which is received, each time the program is transferred from the server computer.

According to the above-described virtual disk management program, the storage device management program, the multinode storage system, and the virtual disk management method, it is possible to access the data in the storage device to be connected via a virtual disk without copying the data other than the data in one slice's management information area of the storage device to be connected in which the data has been stored. As a result, it is possible to effectively transfer the data from the storage device to be connected to the virtual disk.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present invention has(have) been described in detail, it should be understood that various changes, substitutions, and alterations could be made hereto without departing from the spirit and scope of the invention.

What is claimed is:

1. A computer-readable storage medium storing a virtual disk management program for causing a computer to carry out management of access to a storage device of which a storage area is divided into a plurality of slices for management, via a virtual disk, wherein the virtual disk management program causes the computer to carry out processing comprising:

generating a virtual disk formed by a plurality of segments each having a same storage capacity as that of each slice, when a connection notice notifying connection of a storage device to be connected is received from a first disk node including the storage device to be connected in which data has already been stored;

allocating one slice of a connected storage device other than the storage device to be connected to a predetermined one of the segments forming the virtual disk, as a data transfer destination slice;

transmitting metadata for transferred data, which is indicative of a result of allocation of the data transfer destination slice, to a second disk node including the connected storage device;

defining one slice of storage area in the storage device to be connected as a management information area, and transmitting a copy request for copying data in the management information area to the data transfer destination slice in the connected storage device, to the first disk node;

allocating a plurality of slices obtained by dividing a storage area other than the one slice of storage area in the storage device to be connected, to segments other than the predetermined one of the slices of the virtual disk;

transmitting a write request for writing metadata for existing data, which is indicative of correspondence between the slices of the storage device to be connected and the segments of the virtual disk, into the management information area, to the first disk node; and transmitting metadata for access, which is indicative of a relationship of allocation of slices to the segments of the virtual disk, to an access node for accessing the storage device to be connected and the connected storage device via the virtual disk.

2. The computer-readable storage medium according to claim 1, wherein the virtual disk management program further causes the computer, in allocating the data transfer destination slice, to carry out a process for referring to metadata indicative of a relationship of allocation of slices of the connected storage device to an existing virtual disk which has been existing from before reception of the connection notice, and defining a slice having no allocation relation, as the data transfer destination slice.

3. The computer-readable storage medium according to claim 1, wherein the management information area is one slice of storage area from a start in the storage device to be connected.

4. The computer-readable storage medium according to claim 1, wherein the virtual disk management program further causes the computer to carry out, after transmitting the write request for writing the metadata for existing data into the management information area, a process for transmitting, to a disk node for managing slices redundantly allocated respectively to segments of the virtual disk, metadata for duplexing, which is indicative of correspondence between the segments of the virtual disk and the redundantly allocated slices.

5. A computer-readable storage medium storing a storage device management program for causing a computer to carry out management of access to a storage device from other nodes, wherein the storage device management program causes the computer to carry out processing comprising:

transmitting a connection notice notifying connection of a storage device to be connected in which data has already been stored, to a control node;

defining a predetermined one slice of storage area in the storage device to be connected, as a management information area, and upon reception of a copy request for copying data in the management information area to a data transfer destination slice in a connected storage device, from the control node, transmitting the data in the management information area to a disk node to which the connected storage device is connected; and writing, upon reception of a write request for writing metadata for existing data, which is indicative of correspondence between slices of the storage device to be connected and segments of a virtual disk, into the management information area, from the control node, the metadata for existing data into the management information area.

6. The computer-readable storage medium according to claim 5, wherein the storage device management program further causes the computer to carry out a process for storing metadata storing form information indicating that the metadata for existing data is stored in the management information area, into the management information area.

7. The computer-readable storage medium according to claim 6, wherein the storage device management program further causes the computer to recognize that the metadata for existing data is stored in the management information area by referring to the metadata storing form information, and read out the metadata for existing data, from the management information area.

8. A multinode storage system in which access to a plurality of storage devices each having a storage area thereof divided into a plurality of slices, for management, is performed via a virtual disk, comprising:

a control node comprising:
a virtual disk-generating unit configured to generate a virtual disk formed by a plurality of segments each having a same storage capacity as that of each slice, when a connection notice notifying connection of a storage device to be connected is received from a first disk node including the storage device to be connected in which data has already been stored;

a first slice-allocating unit configured to allocate one slice of a connected storage device other than the storage device to be connected to a predetermined one of the segments forming the virtual disk, as a data transfer destination slice, and transmit metadata for transferred data, which is indicative of a result of allocation of the data transfer destination slice, to a second disk node including the connected storage device;

a copy request-transmitting unit configured to define one slice of storage area in the storage device to be connected as a management information area, and transmit a copy request for copying data in the management information area to the data transfer destination slice in the connected storage device, to the first disk node;

a second slice-allocating unit configured to allocate a plurality of slices obtained by dividing a storage area other than the one slice of storage area in the storage device to be connected, to segments other than the predetermined one of the slices of the virtual disk, and transmit a write request for writing metadata for existing data, which is indicative of correspondence between the slices of the storage device to be connected and the segments of the virtual disk, into the management information area, to the first disk node; and a slice allocation information-transmitting unit configured to transmit metadata for access, which is indicative of a relationship of allocation of slices to the segments of the virtual disk, to an access node for accessing the storage device to be connected and the connected storage device via the virtual disk, the first disk node comprising:
- a connection notice-transmitting unit configured to transmit a connection notice notifying connection of the storage device to be connected, to the control node;
- a data transmitting unit configured to transmit, upon reception of the copy request from the control node, the data in the management information area to a disk node to which the connected storage device is connected; and
- a metadata writing unit configured to write the metadata for existing data into the management information area, upon reception of a write request for writing the metadata for existing data, which is indicative of correspondence between slices of the storage device to be connected and segments of the virtual disk, into the management information area, from the control node, and the second disk node comprising:
- a metadata changing unit configured to change metadata stored in the connected storage device in association with the data transfer destination slice into the metadata for transferred data, when the metadata for transferred data is received from the control node; and
- a data writing unit configured to write the received data into the data transfer destination slice, by determining the data transfer destination slice according to the metadata for transferred data upon reception of the data in the management information area from the first disk node.

* * * * *